(12) United States Patent
Toguri

(10) Patent No.: US 8,827,620 B2
(45) Date of Patent: Sep. 9, 2014

(54) LENGTHY ARTICLE CONVEYING APPARATUS

(75) Inventor: Naoki Toguri, Shiga (JP)

(73) Assignee: Daifuku Co., Ltd. (JP)

( * ) Notice: Subject to any disclaimer, the term of this patent is extended or adjusted under 35 U.S.C. 154(b) by 276 days.

(21) Appl. No.: 13/351,929

(22) Filed: Jan. 17, 2012

(65) Prior Publication Data

US 2012/0183377 A1 Jul. 19, 2012

(30) Foreign Application Priority Data

Jan. 17, 2011 (JP) .................................. 2011-007202

(51) Int. Cl.
*B66B 1/44* (2006.01)
*B65G 1/04* (2006.01)

(52) U.S. Cl.
CPC ............... *B65G 1/0421* (2013.01); *B66B 1/44* (2013.01); *B65G 1/0442* (2013.01); *B65G 2201/0217* (2013.01)
USPC .......................................... 414/281; 414/282

(58) Field of Classification Search
USPC ............ 414/273, 401, 402, 281, 282; 180/65, 180/168
See application file for complete search history.

(56) References Cited

U.S. PATENT DOCUMENTS

| | | | |
|---|---|---|---|
| 4,003,296 A | 1/1977 | Wentz | |
| 5,798,920 A | 8/1998 | Crucius | |
| 6,179,541 B1 | 1/2001 | Rioux | |
| 7,909,559 B2 * | 3/2011 | Lukas et al. | 414/282 |
| 2010/0057246 A1 * | 3/2010 | Hansl et al. | 700/215 |
| 2012/0183377 A1 * | 7/2012 | Toguri | 414/281 |

FOREIGN PATENT DOCUMENTS

| | | |
|---|---|---|
| AT | 348422 | 10/1976 |
| EP | 0116152 | 12/1983 |
| JP | 61007141 | 1/1986 |
| JP | 2000177940 | 6/2000 |
| JP | 2007182278 | 7/2007 |

OTHER PUBLICATIONS

European Search Report of App. No. 12151005.1.

* cited by examiner

*Primary Examiner* — Gregory Adams
*Assistant Examiner* — Emery Hassan
(74) *Attorney, Agent, or Firm* — Mayback & Hoffman, P.A.; Gregory L. Mayback; Rebecca A. Tie

(57) ABSTRACT

A lengthy article transferring apparatus transfers lengthy articles between the apparatus and target locations for the transfer. A lifting driving device lifts and drives a platform and a transferring device mounted thereon by winding a cord-like member. A controller controls actuation of the lifting driving device and the transferring device. A lifted position detector monitors the position of the platform. The controller performs the transferring operation to actuate the transferring device when end portions of the platform are received and supported by receivers provided at the target locations for the transfer, and performs a lifted position adjustment procedure controlling actuation of the lifting driving device based upon information detected by the lifted position detector during the transferring procedure to absorb variation in the position of the platform caused by a shift in the load acting on the platform as the article is transported in the article transferring direction.

14 Claims, 15 Drawing Sheets

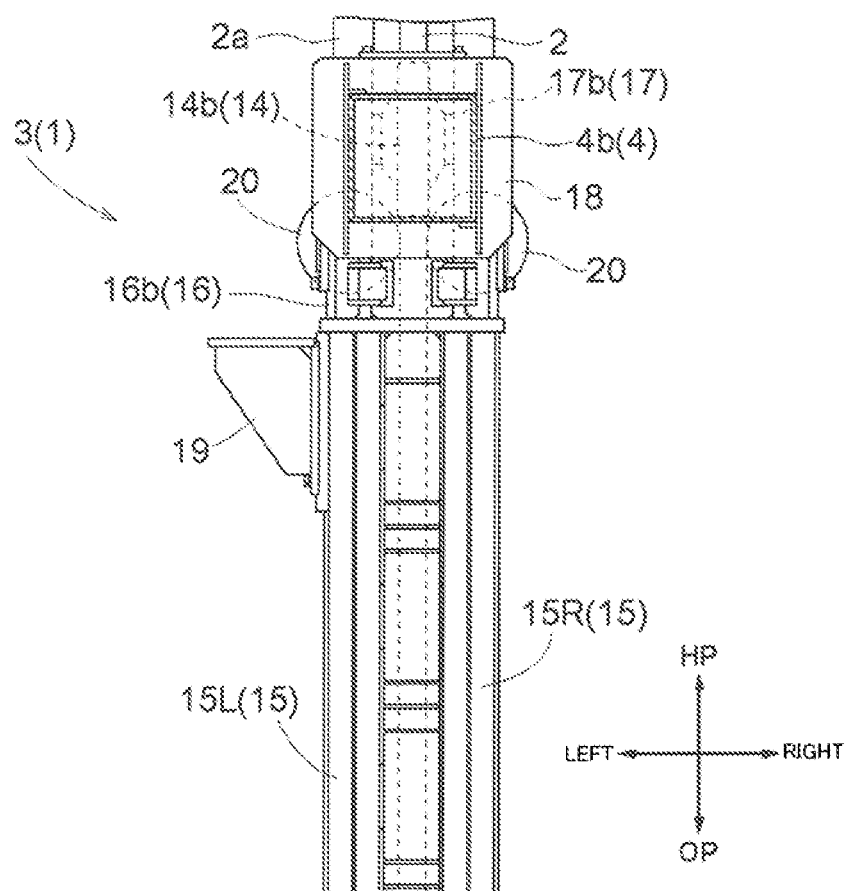
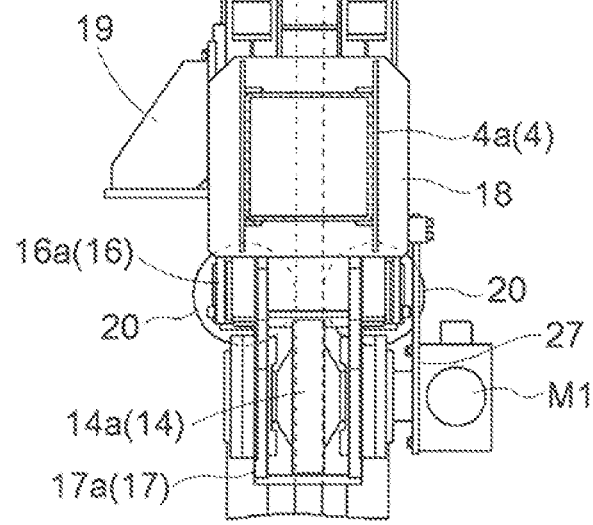
FIG. 3

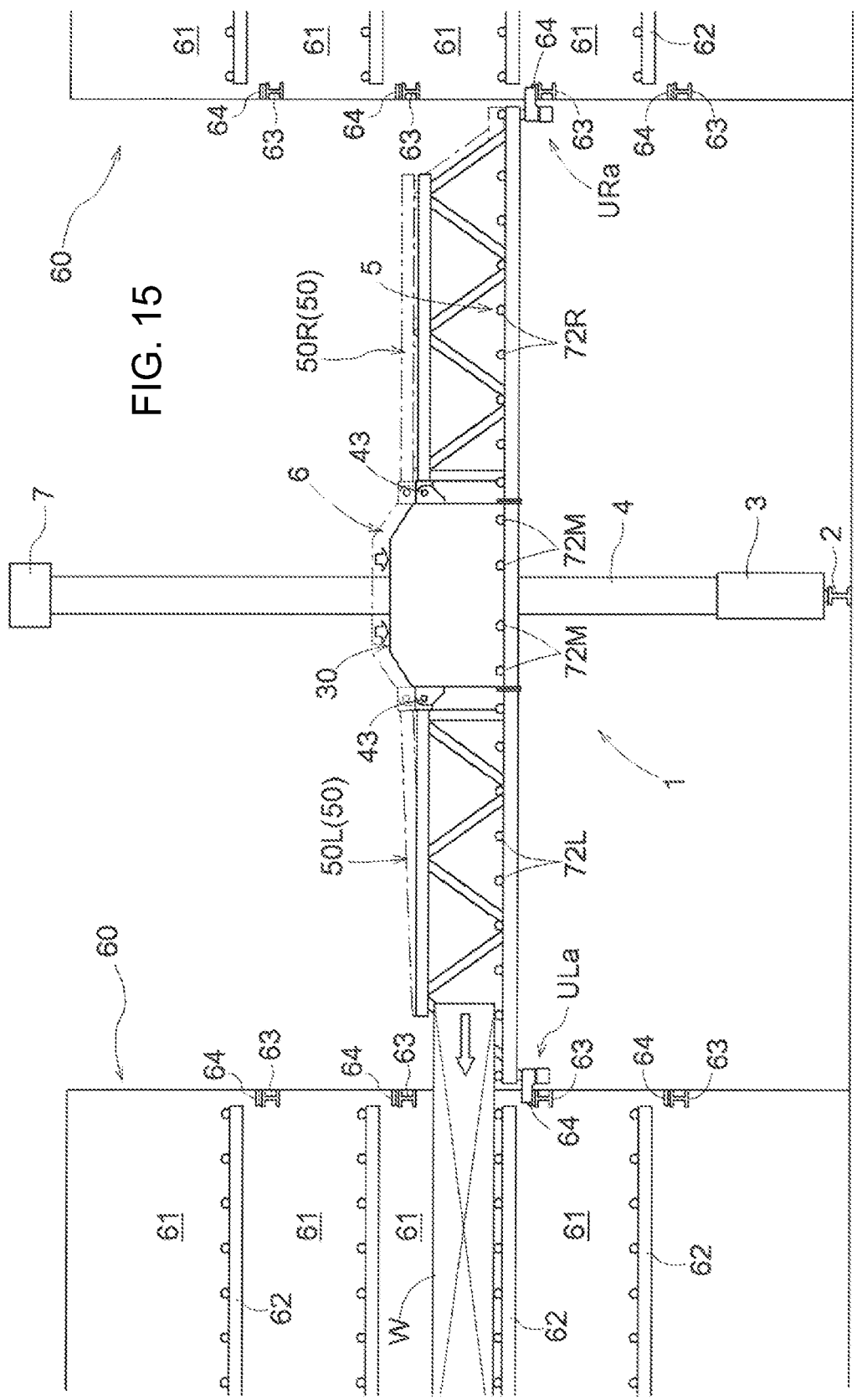

LENGTHY ARTICLE CONVEYING APPARATUS

CROSS-REFERENCE TO RELATED APPLICATIONS

This application claims the priority, under 35 U.S.C. §§119 and 371, of Japanese patent application No. 2011-007202, filed Jan. 17, 2011; the prior application is herewith incorporated by reference in its entirety.

STATEMENT REGARDING FEDERALLY SPONSORED RESEARCH OR DEVELOPMENT

Not Applicable

FIELD OF THE INVENTION

The present invention relates to a lengthy article conveying apparatus. The lengthy article conveying apparatus comprises a platform that is freely lifted along lifting masts, while being suspended and supported by a cord-like member and being guided and supported by the lifting masts; a transfer device that is provided on the platform and freely lifted with the platform in a united manner and is disposed to mount and convey the lengthy article in a condition in which the longitudinal direction of the article becomes horizontal and to freely transfer the article between a target location to be transferred and the transferring device; a lifting driving means for driving the platform and the transfer device to be lifted by winding the cord-like member; and a control means for controlling the actuation of the lifting driving means and the transferring device.

BACKGROUND OF THE INVENTION

Conventional lengthy article conveying apparatuses allow the lengthy article to be conveyed between a transfer device and target transfer locations with different heights in a vertical direction with the aid of the transferring activity of the transfer device and a lifting activity of the platform. For instance, the apparatus is comprised of a stacker crane, which is used in an automated storage system, where a pair of storage racks having a plurality of article storages lengthwise and breadthwise for storing articles there and a consign board where the articles are loaded to or unloaded from the outside. The stacker crane performs the article loading work for conveying articles from the origin to the destination, considering the loading board as the target location origin and the storage as the target location destination and the article unloading work for conveying articles from the origin to the destination, considering the storage as the target location origin and the loading board as the target location destination.

A conventional lengthy article conveying apparatus is disclosed in Japanese Patent Preliminary Publication No. 2000-191114, in which a lifted position detecting means is provided for detecting the lifted position of the platform. In this apparatus, a control means for controlling the actuation of the lifting driving means and the transfer device performs the lifting procedure to position the platform at a lifting position for transferring in accordance with information detected by the lifting position detecting means, at which the outside end portion of the platform is received and held by a receiver provided at the target location for the transfer in the article transferring direction. After the lifting procedure has been completed, the control means performs an article transferring procedure by which the transferring device is conveyed in a condition in which the end portion is received and held by the receivers provided at the target location for the transfer (see FIG. 8 of JP 2000-191114).

This patent publication discloses an automated storage system provided with a pair of article storage racks, which are disposed so that the article storing and retrieving directions face one another. In this system, a stacker crane for conveying lengthy articles is provided and is able to freely run along a transfer path formed between the pair of article storage racks. When transferring an article between the stacker crane and the article storage constituting the target location for the transfer, a transfer device is operated to transfer the article under a condition in which the outside end portions of the platform in the article transferring direction are received and held by receivers on the article storage constituting the target location for the transfer and by a receiver on another article storage, an article storage in the other article storage rack facing the article storage constituting the target location for transfer. According to the construction of such a conventional lengthy article transfer apparatus, the load of articles to be conveyed by the transferring device or the load by the weight of the edge side portions of the platform itself acting upon the end portions of the platform can be supported at the target location side for the transfer. Therefore, the platform can be supported in a stable manner by both the cord-like member and the target location for the transfer, and a smooth transfer of articles can be carried out by making the height of articles to be mounted and conveyed with the aid of the transfer device in the platform flush with the height of articles to be supported at the target location for the transfer.

In this conventional lengthy article transfer apparatus, while the transferring process is performed in a condition in which the platform is at the transferring lifting position at which the outer side end portion of the platform in the article transfer direction is received and held by the receiver at the target location for the transfer, the operation of the lifting driving means is maintained in a suspended condition. Therefore, when the transfer procedure of an article from the target location for the transfer to the platform is carried out, as the article is being transferred to the platform side along the article transferring direction, the load acting upon the platform increases and the increase makes the elongation margin of the cord-like member, which suspends and supports the platform, longer, and the lifted position of the platform shifts downwardly in accordance with the elongated margin of the cord-like member. This being the case, if the platform is moved down during the transferring procedure, the platform will be moved down whilst the outside end portions of the platform in the article transfer direction are being received and held at the receiver at the target location for the transfer, thus the platform becomes liable to deformation or damage.

In addition, when the transfer procedure of an article from the platform to the target location for the transfer is carried out, as the article is transferred to the target location for the transfer side along the article transferring direction, the load acting upon the platform decreases and the decrease makes the elongation margin of the cord-like member, which suspends and support the platform, shorter, and the lifted position of the platform is shifted upwardly in accordance with the elongated margin of the cord-like member. This being the case, if the platform is lifted up during the transferring procedure, the outside end portions of the platform in the article transfer direction are borne down by the weight of the article, and just after the rear end portion of the article passes over the outside end portion of the platform in the transferring direction, the rear end portion, which has been born down with the aid of the load of the article, suddenly jerks upward, so that the rear end portion of the article is damaged or the platform is also damaged by the vibration caused by this jerking.

SUMMARY OF THE INVENTION

The present invention is designed with the above-mentioned situation taken into consideration and provides a lengthy article transferring apparatus by which lengthy articles can be transferred with respect to a target location for the transfer. As used herein, the terms "lengthy article" or "lengthy articles" refers to elongated articles having any number of shapes including, for example, rod shapes, columnar shapes, plate shapes, and the like. A lengthy or elongated article is one that is long in relation to its width and/or height. Although the definition of lengthy article as used herein is not limited to a particular ratio of length to width or length to height or length to width to height, one example of a lengthy article is an article having a length that is at least two times longer than either or both of its width and/or its height.

The first characteristic structure of the lengthy article transferring apparatus according to the present invention is:

- a platform freely lifted along a lifting mast in a condition in which the platform is suspended and supported by a cord-like member and guided and supported by the lifting mast, a transferring device provided to the platform and freely lifted along with the platform in a united manner and for mounting and transporting the lengthy article with its position so that its longitudinal direction is extended in a horizontal direction and for freely transferring the article between the platform and a target location for the transfer;
- a lifting driving means for lifting and driving the platform and the transferring device by winding the cord-like member;
- a controlling means for controlling the actuation of the lifting driving means and the transferring device; and
- a lifted position detecting means for detecting a lifted position of the platform;
- the control means is configured so that it performs a lifting operation for positioning the platform at a lifted position for transferring at which an outside end portion of the platform is received and supported by a receiver provided at a target location for the transfer in the article transferring direction based upon information detected by the lifted position detecting means, and also performs a transferring operation for actuating the transferring device to be transported after the lifting operation has been completed in a condition in which the end portion is received and supported by the receiver at the target location for the transfer, and further performs a lifted position adjustment operation for controlling an actuation of the lifting driving means based upon information detected by the lifted position detecting means during the performance of the transferring operation so as to absorb a variation in the lifted position of the platform due to the shift in load acting on the platform, which varies as the article is transported in the article transferring direction.

According to the first characteristic structure, because the article is conveyed by the transferring device whilst the outside end portion of the platform in the article transferring direction is held and supported by the receiver provided at the target location for the transfer, the load of the article to be transferred by the transfer device and the load acting upon the end portion of the platform due to the weight of the end portion of the platform itself can be supported at the side on the target location of the transfer, it is possible to support the platform with the aid of both the cord from and the article transfer location in a stable manner. Further, by making the height of the article to be mounted and transferred by the transferring device in the platform flush with the height of the article to be supported at the target location for the transfer, the transfer of the article can be smoothly performed.

Further, because the control means performs the lifted position adjustment procedure during the transferring procedure, the lifting driving means actuates during the transferring procedure so that the variation in the lifted position of the platform, due to the variation in load acting upon the platform associated with the conveying of the article in the article transfer direction, is absorbed.

Thus, when the transferring procedure is performed such that the article is transferred from the target location for the transfer to the platform, the load acting upon the platform increases and the increase makes the elongation margin of the cord-like member, which suspends and support the platform, longer, and the lifted position of the platform would be shifted downwardly in accordance with the elongated margin of the cord-like member. However, according to the invention, the downward shift in the lifted position of the platform during the transferring procedure is absorbed by performing the lifted position adjustment procedure with the aid of the control means. Thereby, deformation of or damage to the platform when the platform is lifted down whilst the outside end portion of the platform in the article transferring direction being held and supported at the receiver of the target location for the transfer can be prevented.

Furthermore, when the transferring procedure is performed such that the article is transferred from the platform to the target location for the transfer the platform, the load acting upon the platform decreases and the decrease makes the elongation margin of the cord-like member, which suspends and support the platform, shorter, and the lifted position of the platform would be shifted upwardly in accordance with the elongated margin of the cord-like member. However, according to the invention, the upward shift in the lifted position of the platform during the transfer procedure is absorbed by performing the lifted position adjustment procedure with the aid of the control means. Thereby, a sudden jerking up of the end portions of the platform, which have been born down by the load of the article, can be prevented, and, therefore, causing an accident such that the rear end portion of the article is damaged or the platform is damaged by the fluctuation caused by the jerking up of the article is also prevented. In this manner, according to the first characteristic structure of the present invention, a lengthy article transferring apparatus can be realized by which lengthy articles can be appropriately transferred between the target location for the transfer and the apparatus.

In this manner, the present inventors invented such a lengthy article conveying apparatus by which lengthy articles can be appropriately transferred between the transferring device and the target location for the transfer.

A second characteristic structure of the lengthy article transferring apparatus according to the present invention is the control means is configured such that, when a transferring operation for picking up an article is performed by the transferring operation, i.e., for transferring an article from the target location for the transfer to the transferring device, the control means determines if the platform is lifted down to the lower limit position, which is lower than the lifted position for transferring by a set height based upon information detected by the lifted position detecting means, and controls the actuation of the lifting driving means so as to lift up the platform by a set amount suitable for picking up an article when the platform arrives to the lower limit position, during the time when the transferring operation is performed.

According to the second characteristic structure, when the pick-up transferring operation of the articles from the target location for the transfer to the transferring device is performed, a determination is made to see if the platform has reached the lower limit position in accordance with the shift in the actual lifted position of the platform during the transferring procedure. According to this determination, the downward movement of the platform can be properly obtained and, thus, the shift in the lifted position of the platform can be appropriately absorbed.

In addition, because the platform cannot be lifted up until the platform reaches the lower limit position, the fluctuation of the platform in a vertical direction caused by frequently repeating the downward movement of the platform due to the increase of load of the article and the upward movement thereof due to the lifted position adjustment, can be restricted as much as possible.

Therefore, according to the second characteristic structure, when the pick-up transferring operation is performed, the shift in the lifted position of the platform can be appropriately absorbed in accordance with the actual amount of the downward movement of the platform, while the fluctuation of the platform in a vertical direction is restricted as much as possible.

A third characteristic structure of the lengthy article transferring apparatus of the present invention is the platform, which comprises a base frame to which the cord-like member is connected and a pair of end frames extended into an article transferring direction from both sides of the base frame. The transferring device is configured to freely transfer the article to each of the target locations for the transfer, which are positioned at both sides thereof in the article transferring direction. Bodies to be held, which are received and supported by the receivers provided at the target locations for the transfer, are provided at each of the outer end portions of the pair of end frames in the article transferring direction. Each of the pair of end frames are pivotally connected to the base frame so as to be freely fluctuated about the center of a horizontal axis intersecting to the article transferring direction.

According to the third characteristic structure, it is possible to transfer articles with respect to each of the target locations for the transfer, which are located both sides in the article transfer direction. Therefore, an automated storage system having a high capability for storing articles can be realized by applying the present invention to a stacker crane, which is able to be run along a running path between a pair of article storing racks.

In addition, because each of the pair of end side frames is pivotally connected about the horizontal axis, which intersects to the article transfer direction, with respect to the base side frame in a freely fluctuating manner, even if the platform is pulled down due to an issue such as the lifted position adjustment not properly functioning under a condition in which, for example, the parts to be received at the outside end portions of the pair of edge side frames in the article transfer direction are received and supported by the receivers provided at the target locations for the transfer, each of the pair of edge side frames fluctuate about the horizontal axis with respect to the base frame, to avoid the problem of platform damage.

A fourth characteristic structure of the lengthy article transferring apparatus according to the present invention is a fluctuation detecting means for detecting the fact that at least one of the pair of end frames has fluctuated with respect to the base frame. The controlling means is configured so that it determines that the lifted position of the platform is not in alignment based upon information detected by the fluctuation detecting means in cases when at least one of the pair of end frames fluctuates with respect to the base frame.

According to the fourth characteristic structure, if at least one frame of the pair of end frames fluctuates with respect to the base frame during the time when the transferring device transfers articles due to any problem, such as when the lifted position adjustment procedure does not properly function, the fluctuation is detected by the fluctuation detecting means and, thereby, the control means determines that the lifted position of the platform is not in alignment. Therefore, it is possible to take a countermeasure, such as an emergency stop of the actuation of the lengthy article transferring apparatus. In this way, damage in the case when the end side frames fluctuate with respect to the base frame can be prevented from spreading.

A fifth characteristic structure of the lengthy article transferring apparatus according to the invention is the control means configured so that, when transferring operation for setting down an article is performed by the transferring operation, i.e., for transferring an article from the transferring device to the target location for the transfer, the control means determines if the platform is lifted up to the upper limit position, which is higher than the lifted position for transferring by a set height based upon information detected from the lifted position detecting means, and controls the actuation of the lifting driving means so as to move down the platform by a set amount appropriate for setting down an article when the platform arrives to the higher limit position, during the time when the transferring operation is performed.

According to the fifth characteristic structure, when the setting-down transfer of articles from the transferring device to the target location for the transfer is performed, a determination is made to see if the platform has reached the upper limit position based on the shift in the actual lifted position of the platform during the transferring procedure. According to this determination, the upward movement of the platform can be properly obtained and, thus, the shift in the lifted position of the platform can be appropriately absorbed.

In addition, the platform is configured so that it cannot be moved down until it reaches the upper limit position. Thus, the fluctuation of the platform in a vertical direction, which is caused by frequently repeating the upward movement of the platform due to the decrease of load of the article and the downward movement of the platform due to the lifted position adjustment procedure, can be restricted as much as possible.

Therefore, according to the fifth characteristic structure, when setting-down transfer of articles is performed, the shift in the lifted position of the platform can be appropriately absorbed in accordance with the actual amount of the upward movement of the platform, whilst the fluctuation of the platform in a vertical direction is restricted as much as possible.

A sixth characteristic structure of the lengthy article transferring apparatus according to the invention is the platform comprising detecting sensors formed at the end portions of the platform for freely detecting the portion to be detected, which is provided at the target location for the transfer so as to correspond with the receivers. The portions to be detected are disposed to be detected by the detecting sensors in a condition when the end portions of the platform have been received by the receivers. The control means is configured so that it stops an actuation of the lifting driving means when the detecting sensors detect the portions to be detected, assuming that the platform is positioned at the lifted position for transferring.

According to the sixth characteristic structure, based upon information detected by the lifted position detecting means during the time when moving the platform down with a lifting speed appropriate for seating, i.e., set to be a lower speed than the lifting speed for transferring articles, the actuation of the lifting driving means is stopped at the timing when the detecting sensor detects the portion to be detected, when it is corresponds to the receiver.

The portions to be detected are so configured to detect the portions by the sensors if the end portion of the platform is being held by the receivers. Thus, when the portions to be detected are detected by the detecting sensors, the platform is properly positioned at the lifting position for the transfer, i.e., where the end portion of the platform is held by the receivers.

The platform suspended and supported by the cord-like member would be deformed such that the end portion are flexed downward due to the load of the article and the weight of the platform itself if the end portions thereof are not received and supported by the receivers because the degree of the deformation depends on the loads of the article or the size of the article to be loaded. If the lifted position of the platform is decided using the target location for the transfer only according to information detected by the lifted position detecting means, the end portion of the platform would not be appropriately received and supported by the receivers at the article transferring position. Then, by a control where actuation of the lifting driving means is stopped at the time when the portions to be detected are detected by the sensor, whilst controlling the actuation of the lifting driving means so as to lift the platform down with a set lifting speed in accordance with information detected by the lifting position detecting means, it would be possible to stop the platform at a lifted position at which the end portion of the platform are appropriately received by the receivers.

In this manner, according to the sixth structure, even if the end portion of the platform is deformed by being flexed downward, it is possible to stop the platform at an appropriate lifted position, i.e., the lifting position for the transfer, so that the condition can be realized that the end portions of the platform are appropriately received by the receivers.

A seventh characteristic structure of the lengthy article transferring apparatus according to the invention is that the platform comprises an upper frame and a lower frame, which are disposed in parallel and are spaced apart in an upper and lower direction along the article transferring direction, and a plurality of inclined members disposed in the article transferring direction in a condition along a perpendicular plane connecting the upper and lower frames to each other to constitute a pair of truss frame portions. The truss frame portions are provided in a horizontal direction perpendicular to the article transferring direction with a space therebetween. The pair of truss frame portions are connected to each other with the aid of a plurality of horizontal members being disposed in the article transferring direction so as to constitute a truss frame in which an article containment space is formed for freely containing articles to be conveyed. The transferring device is configured by a transferring conveyor that is mounted and supported by the plurality of horizontal members of the truss frame.

According to the seventh characteristic structure, because the platform is comprised of a truss frame body comprising a pair of truss frame portions having a plurality of inclined members, disposed in the article transferring direction along a vertical plane connected to each other with the aid of a plurality of horizontal members, the strength against a stress of the platform in a vertical direction is improved and, thus, the deformation of the end portion of the platform by flexed downwardly is prevented in a condition in which the end portions are not received and supported by the receivers.

Further, because the transferring conveyor constituting the transferring device is mounted and supported by the plurality of horizontal members of the truss frame body, the transferring conveyor is mounted and supported by the truss frame body by which the end portion of the platform is not deformed easily by being flexed downwardly so much. Therefore, when the platform is lifted up during the prosecution of the article transferring operation, the deformation of the platform is restricted by the high strength of the truss frame body in addition to the absorption of the shift in the lifted position by the lifted position control operation, so the attitude of the transferring device during the transferring process is made stable and, thus, a smooth mounting and transferring of articles by the transferring device can be realized.

With the foregoing and other objects in view, there is provided, in accordance with the invention, a lengthy article transferring apparatus comprises a lifting mast, a cord-like member, a platform, a lifting driving means for lifting and driving the platform and the transferring device by winding the cord-like member, a lifted position detecting means, and a controlling means. The platform is suspended and supported by the cord-like member, is operable to be freely lifted along the lifting mast and guided and supported by the lifting mast, has an outside end portion and a transferring device operable to be freely lifted along with the platform in a united manner. The transferring device is operable to mount and transport a lengthy article in a manner in which a longitudinal extent of the lengthy article is extended horizontally and to freely transfer the lengthy article between the platform and a target location for the transfer. The lifted position detecting means detects a lifted position of the platform. The controlling means controls actuation of the lifting driving means and the transferring device. The controlling means is operable to perform a lifting operation for positioning the platform at a lifted position for transfer, at which the outside end portion of the platform is received and supported by a receiver provided at the target location for the transfer in an article transferring direction based upon information detected by the lifted position detecting means, after the lifting operation has been completed, to perform a transferring operation that actuates the transferring device when in a condition in which the end portion is received and supported by the receiver at the target location for the transfer, and to perform a lifted position adjustment procedure that controls actuation of the lifting driving means based upon information detected by the lifted position detecting means during performance of the transferring operation to absorb a shift in the lifted position of the platform due to a variation in load acting on the platform, which load varies as the lengthy article is transported in the article transferring direction.

In accordance with another feature of the invention, the control means is operable to determine if the platform has lifted down to a lower limit position, when the transferring operation for picking up the lengthy article to transfer the lengthy article from the target location to the transferring device is performed by the transferring operation as the lifted position adjustment procedure, which lower limit position is only lower than the lifted position for transferring by a set height based on information detected from the lifted position detecting means, and control actuation of the lifting driving means to lift up the platform by a set amount appropriate for picking up the lengthy article when the platform arrives at the lower limit position during the time when the transferring operation is performed.

In accordance with a further feature of the invention, the platform comprises a base frame to which the cord-like member is connected, the base frame having sides and a pair of end frames extended in the article transferring direction from both sides of the base frame, each of the pair of end frames having outer end portions and being pivotally connected to the base frame to be freely fluctuated about a center of a horizontal axis intersecting the article transferring direction, and the transferring device is operable to freely transfer the lengthy article to each of various target locations for the transfer, the target locations being positioned at both sides of the platform in the article transferring direction, and bodies to be held are provided at each of the outer end portions of each of the pair of end frames in the article transferring direction, the bodies being received and supported by receivers provided at the target locations for the transfer.

In accordance with an added feature of the invention, there is provided a fluctuation detecting means for detecting if at least one of the pair of end frames has fluctuated with respect to the base frame, the controlling means being operable to determine if the lifted position of the platform is not correct based upon information detected by the fluctuation detecting means in cases in which at least one of the pair of end frames has fluctuated with respect to the base frame.

In accordance with an additional feature of the invention, when transferring a lengthy article from the transferring device to the target location for the transfer is performed by the transferring operation, the control means is operable to determine if the platform has been lifted up to an upper limit position, which is only higher than the lifted position for transferring by a set height based upon information detected by the lifted position detecting means and to control actuation of the lifting driving means to move down the platform by a set amount appropriate for setting down the lengthy article when the platform arrives at the upper limit position.

In accordance with yet another feature of the invention, the platform comprises detecting sensors for freely detecting the portions to be detected at the target location for the transfer corresponding to receivers, the portions to be detected being disposed to be detected by the detecting sensors in a condition in which the end portions of the platform have been received by the receivers, and the control means is operable to stop an actuation of the lifting driving means when the detecting sensors detect the portions to be detected and the platform is positioned at the lifted position for transferring.

In accordance with yet a further feature of the invention, the platform comprises upper and lower frames in parallel and spaced apart from each other in a vertical direction along the article transferring direction, horizontal members, and a plurality of inclined members disposed in the article transferring direction along a perpendicular plane to connect the upper and lower frames to each other and form a pair of truss frame portions, the truss frame portions being disposed horizontally perpendicular to the article transferring direction with a space therebetween, the pair of truss frame portions being connected to each other with the horizontal members disposed in the article transferring direction to form a truss frame in which is defined an article containment space for freely containing the lengthy articles to be conveyed, and the transferring device comprises a transferring conveyor mounted and supported by the horizontal members of the truss frame.

With the objects of the invention in view, there is also provided a lengthy article transferring apparatus, comprises a lifting mast, a cord-like member, a platform, a lifting driver operable to lift and drive the platform and the transferring device by moving the cord-like member, a lifted position detector operable to detect a lifted position of the platform, and a controller programmed to control actuation of the lifting driver and the transferring device. The platform is suspended and supported by the cord-like member, is operable to be freely lifted along the lifting mast and guided and supported by the lifting mast, has an outside end portion and a transferring device operable to be freely lifted along with the platform in a united manner, the transferring device being operable to mount and transport a lengthy article in a manner in which a longitudinal extent of the lengthy article is extended horizontally and to freely transfer the lengthy article between the platform and a target location for the transfer. The controller is operable to perform a lifting operation for positioning the platform at a lifted position for transfer, at which the outside end portion of the platform is received and supported by a receiver provided at the target location for the transfer in an article transferring direction based upon information detected by the lifted position detector, after the lifting operation has been completed, to perform a transferring operation that actuates the transferring device when in a condition in which the end portion is received and supported by the receiver at the target location for the transfer, and to perform a lifted position adjustment procedure that controls actuation of the lifting driver based upon information detected by the lifted position detector during performance of the transferring operation to absorb a shift in the lifted position of the platform due to a variation in load acting on the platform, which load varies as the lengthy article is transported in the article transferring direction.

In accordance with yet an added feature of the invention, the controller is operable to determine if the platform has moved down to a lower limit position, when the transferring operation for picking up the lengthy article to transfer the lengthy article from the target location to the transferring device is performed by the transferring operation as the lifted position adjustment procedure, the lower limit position being lower than the lifted position for transferring by a set height based on information detected from the lifted position detector and to control actuation of the lifting driver to lift up the platform by a set amount sufficient to pick up the lengthy article when the platform arrives at the lower limit position during the time when the transferring operation is performed.

In accordance with yet an additional feature of the invention, the platform comprises a base frame to which the cord-like member is connected, the base frame having sides and a pair of end frames extended in the article transferring direction from both sides of the base frame, each of the pair of end frames having outer end portions and being pivotally connected to the base frame to swing freely about a center of a horizontal axis intersecting the article transferring direction, the transferring device is operable to freely transfer the lengthy article to each of various target locations for the transfer, the target locations being positioned at both sides of the platform in the article transferring direction, and bodies to be held are provided at each of the outer end portions of each of the pair of end frames in the article transferring direction, the bodies being received and supported by receivers provided at the target locations for the transfer.

In accordance with again another feature of the invention, there is provided a fluctuation detector operable to detect if at least one of the pair of end frames has fluctuated with respect to the base frame, the controller being operable to determine if the lifted position of the platform is incorrect based upon information detected by the fluctuation detector when at least one of the pair of end frames has fluctuated with respect to the base frame.

In accordance with again a further feature of the invention, when the transferring operation is performed to transfer a lengthy article from the transferring device to the target location, the controller is operable to determine if the platform has been lifted up to an upper limit position higher than the lifted position for transferring by a set height based upon information detected by the lifted position detector and to control actuation of the lifting driver to move down the platform by a set amount appropriate for setting down the lengthy article when the platform arrives at the upper limit position.

In accordance with again an added feature of the invention, the platform comprises detecting sensors operable to detect portions of receivers at the target location for the transfer, the portions to be detected being detectable by the detecting sensors when the end portions of the platform have been received by the receivers and the controller is operable to stop an actuation of the lifting driver when the detecting sensors detect the portions and the platform is positioned at the lifted position for transferring.

In accordance with a concomitant feature of the invention, the platform comprises parallel upper and lower frames spaced apart from each other in a vertical direction along the article transferring direction, horizontal members, and a plurality of inclined members disposed in the article transferring direction along a perpendicular plane and connecting the upper and lower frames to each other to form a pair of truss frame portions, the pair of truss frame portions being disposed horizontally perpendicular to the article transferring direction with a space therebetween, the pair of truss frame portions being connected to each other with the horizontal members disposed in the article transferring direction to form a truss frame in which is defined an article containment space for freely containing the lengthy articles to be conveyed, and the transferring device comprises a transferring conveyor mounted and supported by the horizontal members of the truss frame.

Although the invention is illustrated and described herein as embodied in a lengthy article conveying apparatus, it is, nevertheless, not intended to be limited to the details shown because various modifications and structural changes may be made therein without departing from the spirit of the invention and within the scope and range of equivalents of the claims. Additionally, well-known elements of exemplary embodiments of the invention will not be described in detail or will be omitted so as not to obscure the relevant details of the invention.

Additional advantages and other features characteristic of the present invention will be set forth in the detailed description that follows and may be apparent from the detailed description or may be learned by practice of exemplary embodiments of the invention. Still other advantages of the invention may be realized by any of the instrumentalities, methods, or combinations particularly pointed out in the claims.

Other features that are considered as characteristic for the invention are set forth in the appended claims. As required, detailed embodiments of the present invention are disclosed herein; however, it is to be understood that the disclosed embodiments are merely exemplary of the invention, which can be embodied in various forms. Therefore, specific structural and functional details disclosed herein are not to be interpreted as limiting, but merely as a basis for the claims and as a representative basis for teaching one of ordinary skill in the art to variously employ the present invention in virtually any appropriately detailed structure. Further, the terms and phrases used herein are not intended to be limiting; but rather, to provide an understandable description of the invention. While the specification concludes with claims defining the features of the invention that are regarded as novel, it is believed that the invention will be better understood from a consideration of the following description in conjunction with the drawing figures, in which like reference numerals are carried forward.

BRIEF DESCRIPTION OF THE DRAWINGS

The accompanying figures, where like reference numerals refer to identical or functionally similar elements throughout the separate views, which are not true to scale, and which, together with the detailed description below, are incorporated in and form part of the specification, serve to illustrate further various exemplary embodiments and to explain various principles and advantages all in accordance with the present invention. Advantages of embodiments of the present invention will be apparent from the following detailed description of the exemplary embodiments thereof, which description should be considered in conjunction with the accompanying drawings in which:

FIG. 3 is a fragmentary, top plan and partially hidden view of a carriage of the stacker crane of FIG. 1;

FIG. 15 is a fragmentary front elevational view of an exemplary embodiment of a stacker crane according to the invention with a shift in the lifted position of a platform with another actuation of transferring.

DETAILED DESCRIPTION OF THE INVENTION

Figure 1:
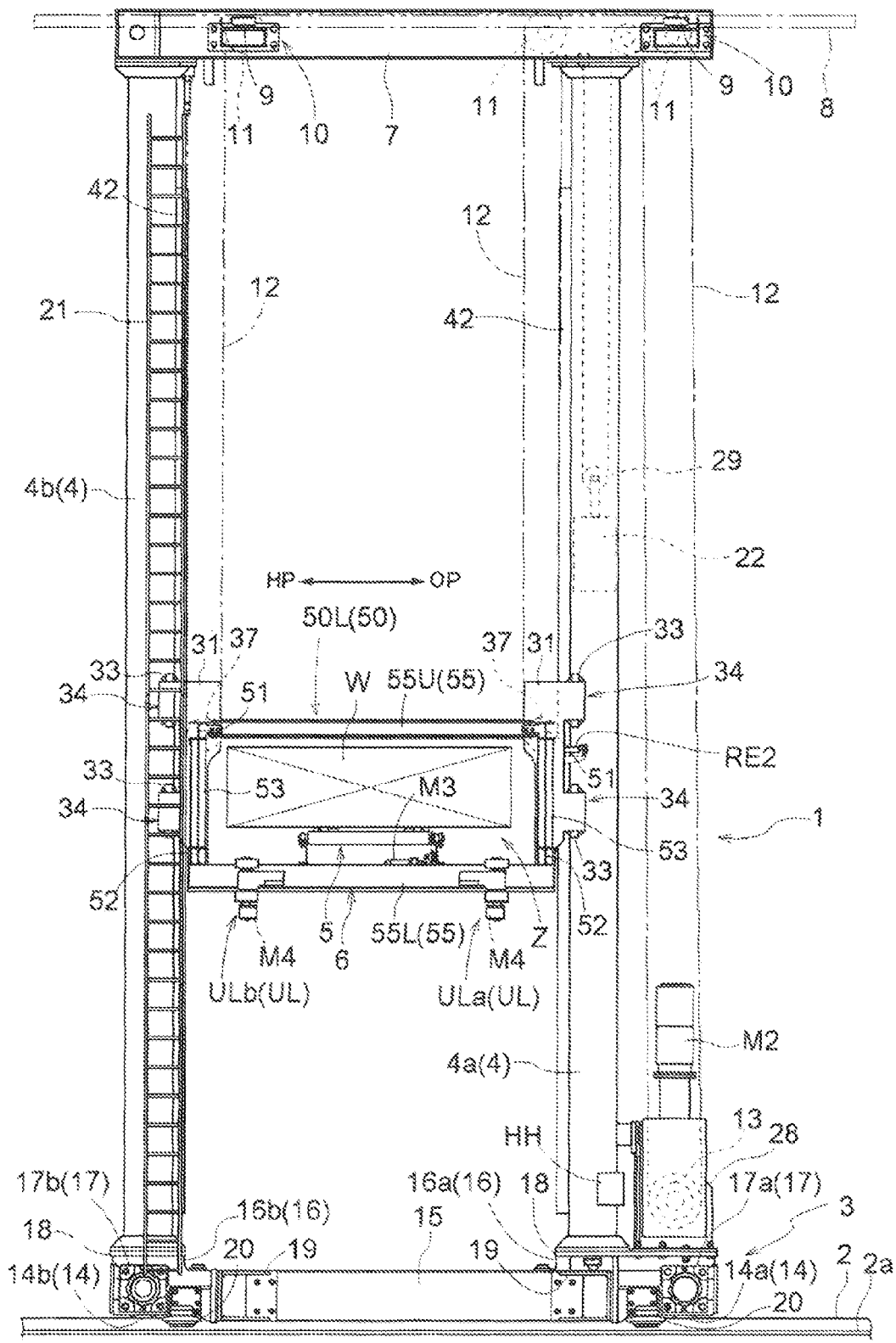
FIG. 1 is a left side elevational and partially hidden view of a stacker crane according to an exemplary embodiment of the invention.

As required, detailed embodiments of the present invention are disclosed herein; however, it is to be understood that the disclosed embodiments are merely exemplary of the invention, which can be embodied in various forms. Therefore, specific structural and functional details disclosed herein are not to be interpreted as limiting, but merely as a basis for the claims and as a representative basis for teaching one skilled in the art to variously employ the present invention in virtually any appropriately detailed structure. Further, the terms and phrases used herein are not intended to be limiting; but rather, to provide an understandable description of the invention. While the specification concludes with claims defining the features of the invention that are regarded as novel, it is believed that the invention will be better understood from a consideration of the following description in conjunction with the drawing figures, in which like reference numerals are carried forward.

Alternate embodiments may be devised without departing from the spirit or the scope of the invention. Additionally, well-known elements of exemplary embodiments of the invention will not be described in detail or will be omitted so as not to obscure the relevant details of the invention.

Before the present invention is disclosed and described, it is to be understood that the terminology used herein is for the purpose of describing particular embodiments only and is not intended to be limiting. The terms "a" or "an", as used herein, are defined as one or more than one. The term "plurality," as used herein, is defined as two or more than two. The term "another," as used herein, is defined as at least a second or more. The terms "including" and/or "having," as used herein, are defined as comprising (i.e., open language). The term "coupled," as used herein, is defined as connected, although not necessarily directly, and not necessarily mechanically.

Relational terms such as first and second, top and bottom, and the like may be used solely to distinguish one entity or action from another entity or action without necessarily requiring or implying any actual such relationship or order between such entities or actions. The terms "comprises," "comprising," or any other variation thereof are intended to cover a non-exclusive inclusion, such that a process, method, article, or apparatus that comprises a list of elements does not include only those elements but may include other elements not expressly listed or inherent to such process, method, article, or apparatus. An element proceeded by "comprises . . . a" does not, without more constraints, preclude the existence of additional identical elements in the process, method, article, or apparatus that comprises the element.

As used herein, the term "about" or "approximately" applies to all numeric values, whether or not explicitly indicated. These terms generally refer to a range of numbers that one of skill in the art would consider equivalent to the recited values (i.e., having the same function or result). In many instances these terms may include numbers that are rounded to the nearest significant figure.

The terms "program," "software," "software application," and the like as used herein, are defined as a sequence of instructions designed for execution on a computer system. A "program," "software," "computer program," or "software application" may include a subroutine, a function, a procedure, an object method, an object implementation, an executable application, an applet, a servlet, a source code, an object code, a shared library/dynamic load library and/or other sequence of instructions designed for execution on a computer system.

Herein various exemplary embodiments of the present invention are described. In many of the different embodiments, features are similar. Therefore, to avoid redundancy, repetitive description of these similar features may not be made in some circumstances. It shall be understood, however, that description of a first-appearing feature applies to the later described similar feature and each respective description, therefore, is to be incorporated therein without such repetition.

Embodiments of the lengthy article transferring apparatus according to the present invention will be explained using the an example of stacker crane in an automated storage system with reference to the drawings.

Figure 2:
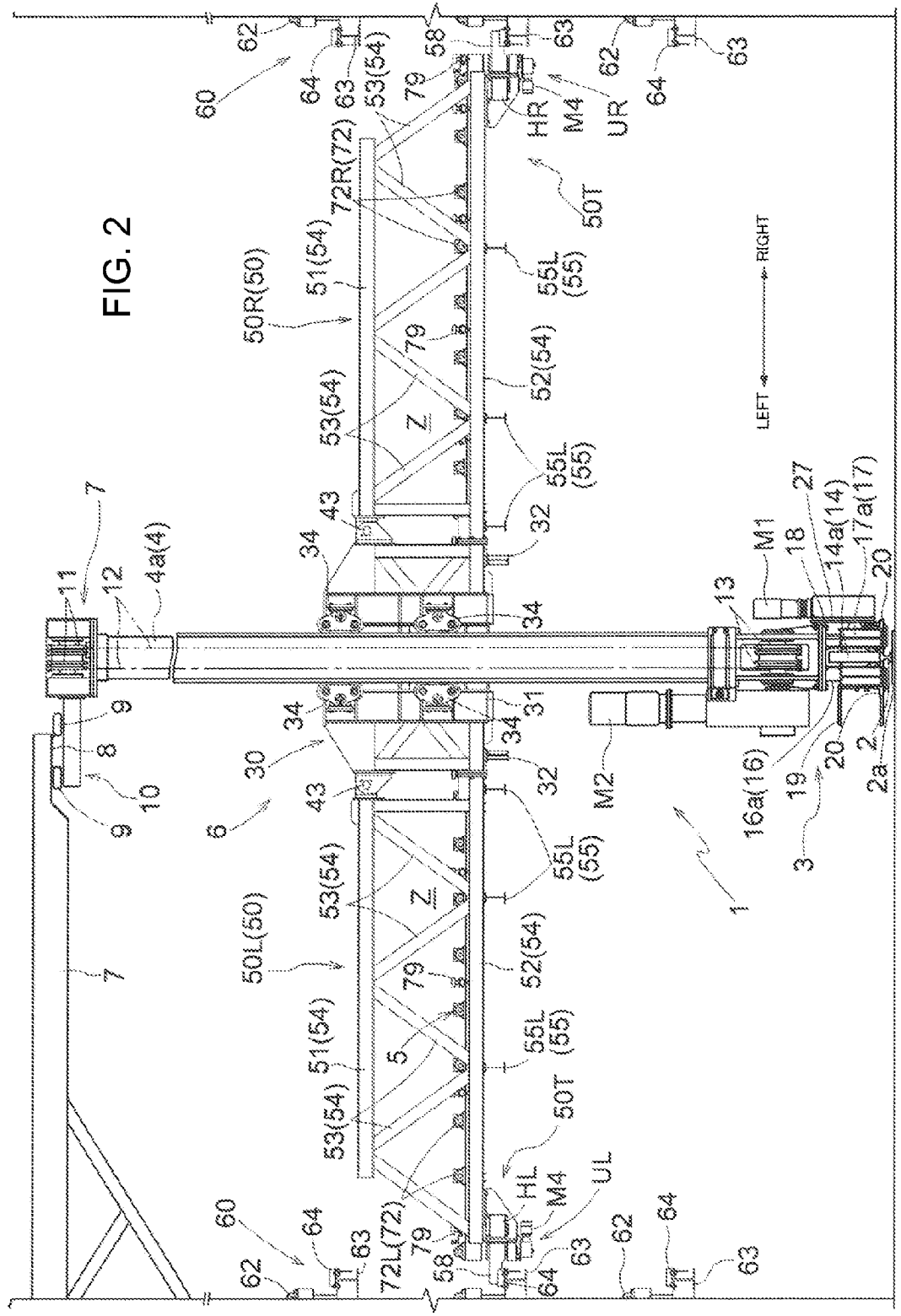
FIG. 2 is a fragmentary, front elevational view of the stacker crane of FIG. 1.

Referring now to the figures of the drawings in detail and first, particularly to FIGS. 1 and 2, there is shown a first exemplary embodiment of a stacker crane 1 constituting a lengthy article conveying apparatus comprises a carriage 3 being runnable along a straight rail 2 provided on a plate 2a for installing the rail on a floor surface, a pair of front and rear lifting masts 4 stood from both front and rear end portions of the carriage in a running direction, a platform 6 which is freely lifted along the lifting masts 4 and between the pair of the lifting masts 4 in a condition in which the both front and rear end portions thereof in the running direction are guided and supported by the corresponding sides of the pair of lifting masts 4, respectively, and an upper frame 7 connecting the upper end portions of the pair of lifting masts 4.

The platform 6 comprises a transferring device 5 constructed by a roller conveyor, by which a lengthy article W, which is longer in left and right direction viewed from the running direction of the carriage 3 (the view shown in FIGS. 14 and 15 and orthogonal to the view of FIG. 1), can be freely mounted and transferred along its longitudinal direction. The transferring device 5 is provided on the platform 6 and can move with the platform 6 in a united manner; and it is configured to mount and transfer the lengthy article W in a position that the longitudinal direction of the article is along a horizontal direction and to freely transfer the article between the device and the target location for the transfer.

The stacker crane 1 performs article conveying work for the article W as the target to be conveyed, i.e., receiving article W at a target location for a transfer origin and then transferring the article to a target location for a transfer destination, by the running actuation of carriage 3, the lifting actuation of platform 6, and the transferring actuation of transferring device 5. It should be noted that the target locations for the transfer are a loading board, which is not shown in the figures, and an article storage 61 of an article storing rack 60 (see FIGS. 14 and 15), which will be explained later.

At an end portion of the rail 2 on the left side of FIG. 1, a home position (HP) is set as the original position of the stacker crane 1, while at the other end portion of the rail 2 on the right side of FIG. 1, an opposite position (OP) is set as the limit position for advancing the stacker crane. Hereinafter, the explanation will be done in the way of defining the positional relationship such that the advancing side when the stacker crane 1 runs from the HP to the OP is referred to as the OP side, and the retrieving side is referred as the HP side, in the front and rear direction of the stacker crane 1; and the left and right direction viewed from the front and rear perspective when viewing the stacker crane 1 from the OP side are referred as the left side and a right side, respectively. FIG. 1 is a left side view of the stacker crane 1, FIG. 2 is a front view of the stacker crane 1 viewed from the OP side in the front and rear direction, and FIG. 3 is a plan view at the lower side thereof in an upper and lower direction.

On the lateral side surface of the upper frame 7, a pair of guide roller units 10 having a pair of left and right upper guide rollers 9, 9 are separately provided in a front and rear direction so as to protrude in the left side direction. It should be noted that the guide rollers 9, 9 are urged against both lateral side surfaces of the upper rail 8, which is suspended and supported by a rail support member provided on the ceiling, parallel to the rail 2. At four positions in the front and rear direction inside of the upper frame 7, upper idler sprockets 11 are provided, respectively. The upper idler sprockets 11 are composed of two pairs of sprockets, in each of which has a pair of two series of sprockets (see FIGS. 4 and 6).

The platform 6 is suspended and supported by a lifting metal chain 12 defined as a cord-like member. In the front and rear direction, the lifting chain 12 connected to the end portion at the OP side and the lifting chain 12 connected to the end portion at the HP side are composed of a set of tow chains, respectively, which are adjacent to each other in the left and right direction, so as to be able to support a sufficient lifting load (see FIG. 6).

The set of lifting chains 12 connected to the OP side end portion of the platform 6 are wound over a return idler sprocket 37 on the platform side (will be explained below); an end of one of the chains 12 that is upwardly guided by the sprocket 37 is fixedly connected to the lower surface of the upper frame 7; and the end of another one of the chains 12 also being upwardly guided by the sprocket 37 is wound over a set of corresponding sprockets in the front and rear direction among those of upper idler sprockets 11, which are provided at two positions on the HP side of the upper frame 7, and this chain is further wound over the upper idler sprocket 11 at the most OP side. That is to say, the upper idler sprockets 11 provided at the two positions on the HP side are disposed such that the one set of two lifting chains 12 is wound over only one of the sets of sprockets out of the two sets of sprockets, i.e., four sprockets in total, whose positions in the axis center direction correspond to those of the set of two lifting chains 12 which should be wound over it.

The upper idler sprockets 11 provided at two positions on the OP side are disposed such that two sets of lifting chains 12, i.e., four chains in total, are wound over the two sets of sprockets, i.e., four sprockets in total, respectively. That is to say, the two sets of lifting chains 12, which have been guided from the upper idler sprockets 11 provided at the two positions on the HP side, respectively, in a horizontal direction and then wound over the upper idler sprocket 11 on the most OP side of the upper frame 7; then the chains 12 are guided downwardly toward the driving sprocket 13, which is rotatably driven by a lifting motor M2 provided at the OP side end portion of the carriage 3 via the upper idler sprocket 11, and then wound over the driving sprocket 13.

The two sets of lifting chains 12 wound over the driving sprocket 13 are guided upwardly toward the upper idler sprocket 11, which is secondly on the OP side of the upper frame 7, and then wound over the upper idler sprocket 11. The two sets of lifting chains 12 wound over the upper idler sprocket 11 are downwardly guided through the inside of the OP side mast toward a counterweight side return idler sprocket 29, which suspends and supports a counterweight 22 provided inside of the OP side mast so as to be freely lifted therethrough. Then, the sets of chains 12 are guided upwardly through the inside of the OP side mast to be connected to the chain connecting portions on the upper frame 7.

In this manner, the lifting motor M2 functions as a lifting driving means for winding the lifting chains 12 defined as the cord-like member to lift the platform 6 and the transfer device 5. In this exemplary embodiment, the pair of lifting chains for suspending and supporting the platform 6 is composed of one set of two chains, respectively, so that the load acting on one of the chains is reduced. Further, the winding path of the lifting chains 12 goes through via the counterweight side return idler sprocket 29, which is freely movable in a vertical direction, and the platform side return idler sprocket 37, so that the lifting load acting on the chains of each set can be reduced.

On both front and rear end portions of the carriage 3, a pair of running wheels 14 is provided, which run on the rail 2. The wheel positioned at the OP side end portion of the carriage 3 is a driving wheel 14a, which is driven by the running motor M1, while the wheel at the HP side end portion of the carriage 3 is an idling wheel 14b, which is freely idled as the running of the carriage 3.

As shown in FIGS. 1 and 3, the carriage 3 is disposed such that an OP side mast supporting frame 16a, which supports the lowest end of the OP side mast 4a, is connected to an OP side end portion of a main frame 15. A pair of left and right intermediate frames 15a and 15b in a front and rear direction are connected to the main frame at a plurality of front and rear positions; and an HP side mast supporting frame 16b for supporting the lowest end of the HP side mast 4b is connected to the HP side end portion of the main frame 15. The front and rear running wheels 14 are supported by the pair of front and rear mast supporting frames 16 via the wheel support frame 17.

Figure 10:
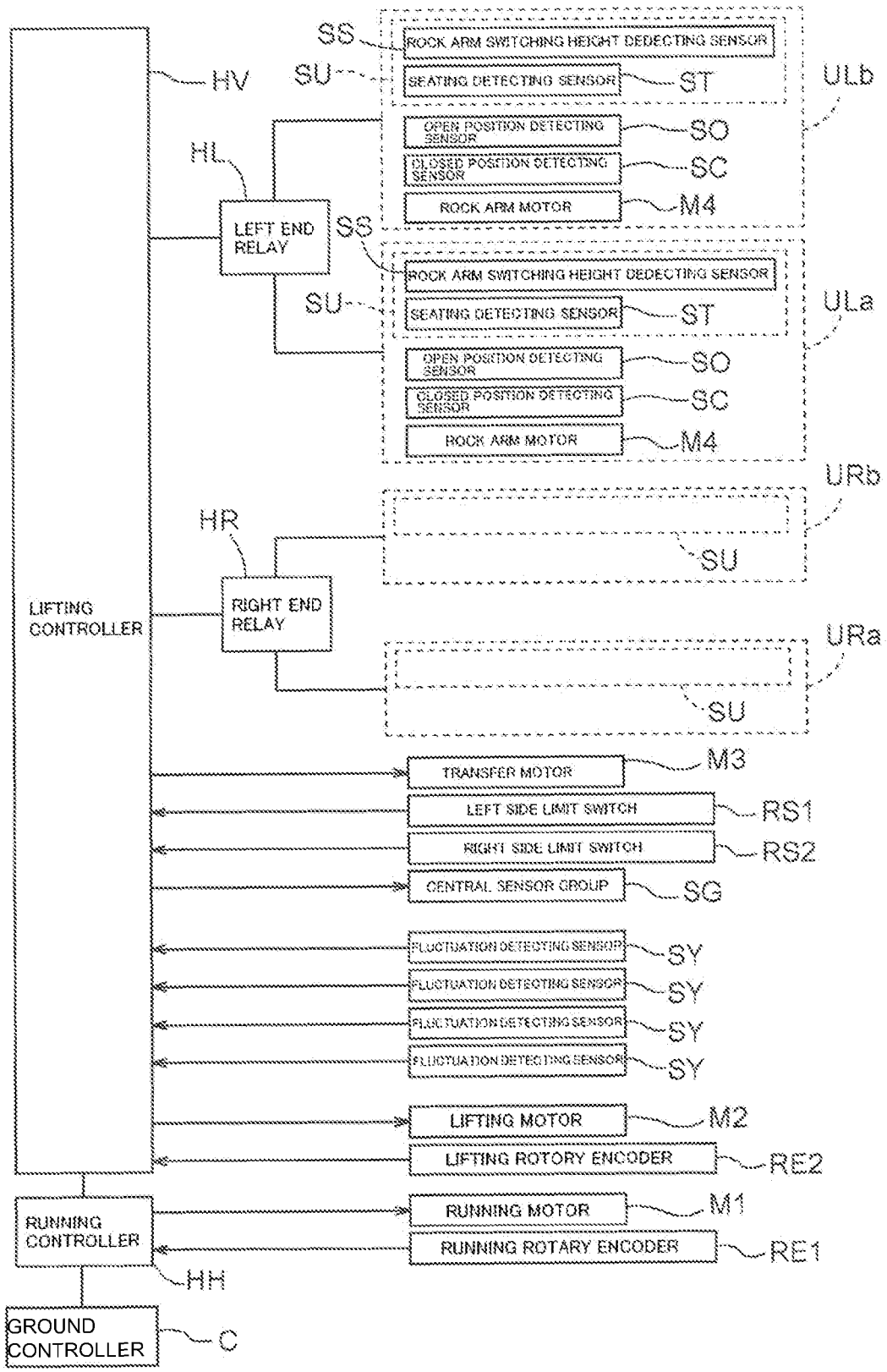
FIG. 10 is a control block diagram of an exemplary embodiment of a control system according to the invention.

That is to say, the driving wheel 14a is rotatably supported by the driving wheel frame 17a, and the driving wheel frame 17a is connected to the OP side mast support frame 16a. Further, the idling wheel 14b is rotatably supported by the idling wheel frame 17b and the idling wheel frame 17b is connected to the HP side mast support frame 16b. Each of the pair of front and rear mast support frames 16 comprises a flange 18 for attaching a mast, to which the connecting portion formed at the lowest portion of the lifting mast 4 is fixed by bolts. Although not shown in the figures, a running rotary encoder RE1 (see FIG. 10) is attached to the idling wheel frame 17b as a running position detecting means, which outputs pulses corresponding to the rotation amount of the idling wheel 14a.

Running motor attaching bracket 27 and lifting motor attaching bracket 28 are fixed to the flange 18 for attaching the OP side mast by bolts and onto these brackets running motors M1 and M2 are fixed in a condition in which running motor M1 is located at the right side of carriage 3 and lifting motor M2 at the left side thereof.

As further shown in FIGS. 1 to 3, to each of the pair of front and rear mast support frames 16, a pair of left and right lower guide rollers 20 are provided via brackets, being urged against the both lateral side surfaces of the rail 2. It should be noted that a pair of front and rear guides 19 are provided on the lateral left side portion of carriage 3 for preventing a the carriage from falling down, which has a horizontal plate that is closely contacted to the upper and lower sides of an anchor pipe (not shown) disposed in parallel to the rail 2 on the floor surface.

Onto the HP side lifting mast 4b, a ladder 21 is provided across the lower end to the upper end, on which an operator rides for the purpose of maintenance. Although not shown in the figures, controlling wire lines or power supply wire lines between platform 6 and carriage 3 are housed in a lifting cable guide, which is provided in a vertical direction at a right side of the OP side lifting mast 4a. One of the ends of the lifting cable guide is connected to the OP side lifting mast 4a and the other one is to platform 6. The lifting cable guide is deformed as platform 6 is lifted, so the movement of the control wire line or the power supply wire line is guided by the deformation.

Although not shown in the figures, the control wire line or the power supply wire line between the ground and carriage 3 of the stacker crane 1 is housed in a running cable guide provided along the side of rail 2; one of the ends of the running cable guide is connected to the floor surface side and the other end is to carriage 3. As stacker crane 1 runs, the running cable guide is deformed, so that the movement of the control wire line or the power supply wire line is guided. Thereby, a ground side controller C (e.g., a computer including a microprocessor), which will be explained later, and stacker crane 1 can communicate control information, and an electric power can be supplied to the stacker crane from a ground side power supply device.

As illustrated in FIGS. 2 and 4 to 6, the platform 6 comprises a base frame 30, to which the lifting chains 12 are connected, and a pair of end frames 50. The pair of end frames 50 is composed of a left end frame 50L and a right end frame 50R and they extend from both sides of the base frame 30 in the article transferring direction, i.e., the left and right direction.

The base frame 30 is configured by a pair of front and rear up-right portions 31, 31 and a horizontal connecting member 32. The up-right portion is constituted by longitudinal steel plates and a lateral steel plate and a cylindrical inclined member, which are welded to each other, and the horizontal connecting member 32 connects the pair of up-right members 31, 31 to each other at left and right end portions and an intermediation portion of the pair of up-right members 31, 31. The up-right members 31, 31 have the same constitution, although the front and rear sides are different, the pair will be explained by the OP side up-right portion 31 as a representative.

Figure 5:
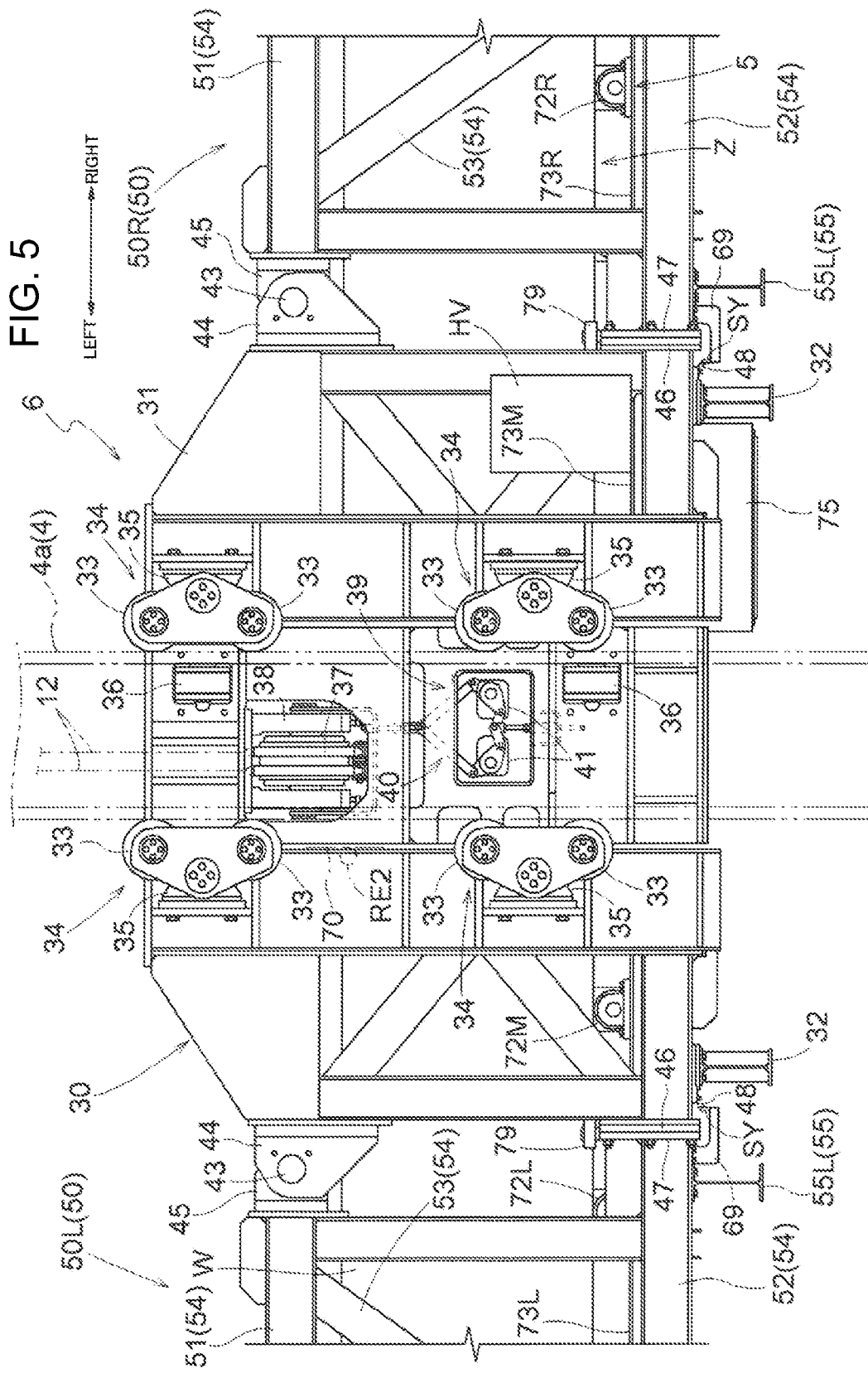
FIG. 5 is a fragmentary, left side elevational and partially hidden view of the construction of a base side frame of a platform and its peripheral portion of the stacker crane of FIG. 1.
Figure 6:
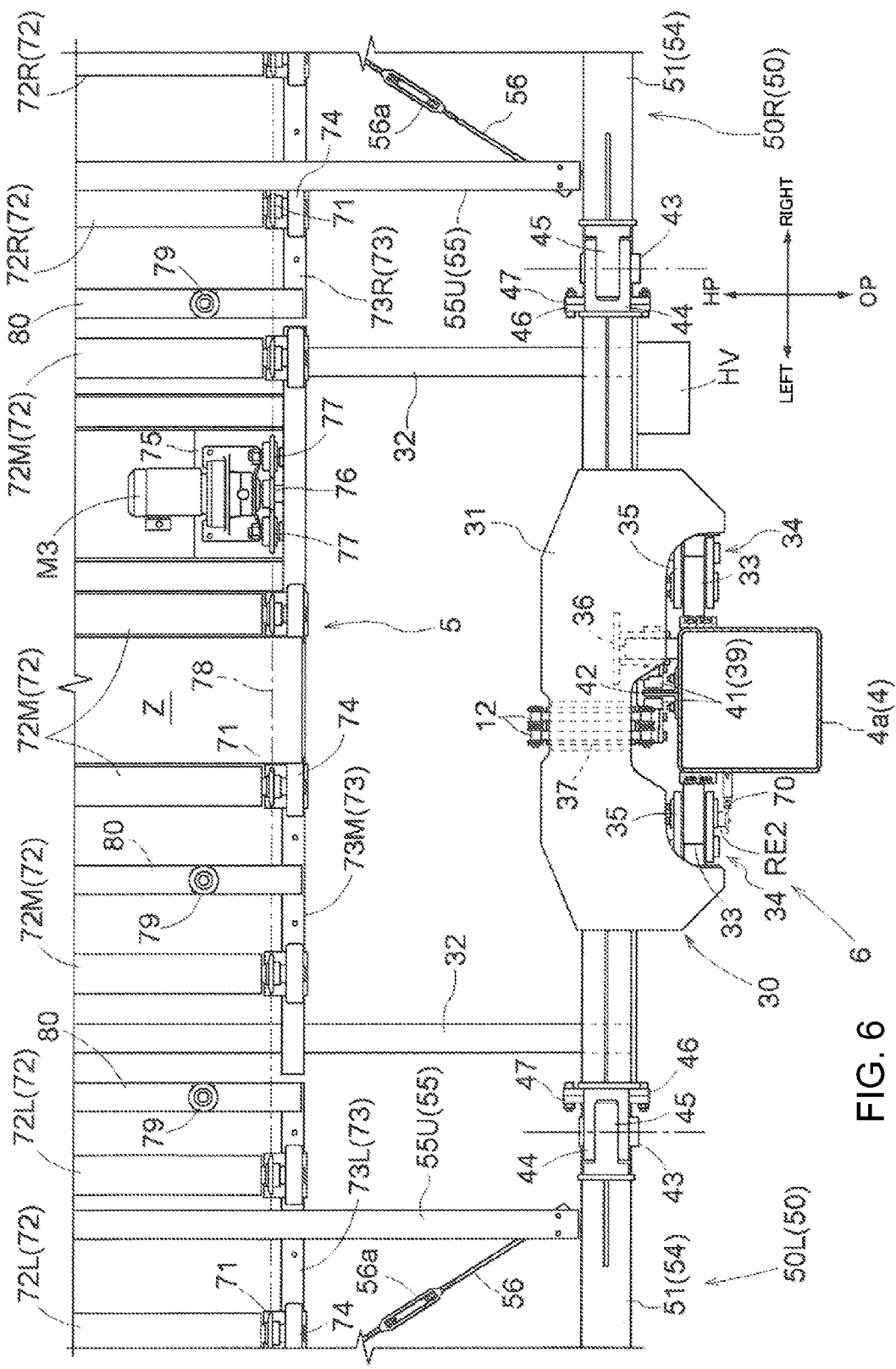
FIG. 6 is a fragmentary, plan and partially hidden view of a portion of a base frame body of a platform and its peripheral portion of the stacker crane of FIG. 1.

As depicted in FIGS. 1, 5 and 6, the up-right portion 31 comprises a plurality of lifting guide rollers 33, which are urged against the left and right both side surfaces of the lifting mast 4 at an outer end portion of the platform 6 in its front and rear direction. A bogie 34 comprises a pair of lifting guide rollers 33, which are provided rotatably about the horizontal shaft in a vertical direction. The bogie 34 is pivotally connected about the horizontal shaft in a freely fluctuated manner with the aid of a bracket 35 for attaching the bogie. It should be noted that four bogies are provided to the up-right portion 31 at the left, right, top and bottom on the OP side thereof, respectively. In other words, against the roller urging plates provided on the left and right side surfaces of the OP side mast 4a along the up and down direction, the pair of lifting guide rollers 33 are urged at two up and down locations in a vertical direction via the bogies 34. Further, the up-right portion 31 includes a pair of upper and lower guide rollers 36, which are urged against the HP side surfaces of the OP side mast 4a, for restricting the movement of the platform 6 in the front and rear direction.

In this manner, a pair of left and right bogies 34 is provided for the pair of up-right portions 31, respectively, in total two pair of bogies 34, in a condition in which the pairs of bogies 34 are separated in the upper and lower direction from one another, so that the platform 6 can be lifted along the lifting mast 4, whilst keeping the front and rear viewing attitude of the base frame 30. Further, because a pair of up and down guide rollers 36 is provided for the pair of front and rear up-right portions 31, respectively, the platform 6 can be lifted along the lifting mast 4 under a condition in which the position of the base frame 30 is in a front and rear direction restricted between the pair of front and rear lifting mast 4.

As represented in FIGS. 5 and 6, on the left side surface of the OP side mast, a fixing chain 70 for detecting the lifted position in a upper and lower direction is parallel to the front and rear roller urging plate. At the up-right portion 31 on the OP side of the base frame 30, an increment-type lifting rotary encoder RE2 is provided where the rotating axis thereof is directed in a lateral direction, and a sprocket is connected to the rotating axis to be freely rotated integrally to the axis of the rotary encoder RE2, whilst being threaded to the fixing chain 70 for detecting the lifted position.

Thereby, as the platform 6 is lifted, the lifting rotary encoder RE2 outputs pulses corresponding to the lifted amount of the platform 6. A lifting controller HV, which will be explained later, manages the counted value of the number of the output pulses from the rotary encoder RE2, resets the counted value of the number of the output pulses at the lifting home position, which is set at the lowest end of the lifting range of the platform 6, and detects the lifted position of the platform 6 by counting the number of the output pulses from the lifting rotary encoder RE2 after setting the platform at the home position. Therefore, the lifting rotary encoder RE2 functions as a lifted position detecting means for detecting the lifted position of the platform 6.

As stated above, the pair of front and rear up right portions 31 comprise platform side return idler sprockets 37, respectively, on the intermediate portions in the left and right direction. The platform side return idler sprocket 37 is rotatably supported by an idler support frame 38, which can be freely lifted up and down and is energized downwardly with the aid of a compressed spring (not shown), for example. At the lowest end of the idler support frame 38, a link mechanism 40 having an anti-drop mechanism 39 is connected. In a case that the lifting chain 12 is cut out, the platform side return idler sprocket 37 is lifted down with the idler support frame 38, which is energized downwards, then the link mechanism 40 operates in a fluctuated manner to let the unti-drop mechanism 39 work.

That is to say, when the lifting chain 12 is cut out, the spring compressed by the weight of the platform 6 is returned to a natural condition, thereby the idler support frame 38 is moved downward with respect to the up right portion 31. By the downward movement of the idler support frame 38, a pair of clipping blocks 41, coupled to the link mechanism 40, is operated in a fluctuated manner about the center of the lateral axis thereof. Therefore, the pair of clipping blocks holds a protruded plate, which is provided along the platform 6 side surface of the lifting mast 4 (for instance, the HP side surface of OP side mast 4a) in an up and down direction and protrudes toward the platform 6 side. In addition, the fluctuated axis center of the pair of clipping blocks 41 is disposed such that, as the platform 6 is lifted down, the pair of clipping blocks 41 is fluctuated to the clipping side of the protruded plate 42 so that the downward movement of the platform 6 is controlled to prevent the dropping thereof.

Although not shown in the figures, it should be noted that a limit switch, which is always ON, is provided on each of the pair of front and rear up right portions 31, and it changes to OFF when the lifting chain 12 is cut out. By the limit switch, once the lifting chain 12 is cut out, the running actuation, the lifting actuation, and the transferring actuation of the stacker crane 1 are emergency stopped.

As represented in FIG. 2, each of the pair of end frames 50 is pivotally connected to the base frame 30 about the center of the horizontal axis that intersects to the left and right direction, i.e., the article transferring direction, in a fluctuatable manner. A further explanation thereof is that the base frame 30 and the pair of left and right end frames 50 are pivotally connected by the pivotable connecting axis 43 at an upper position thereof; the end frames 50 are extended from the base frame 30 in the left and right direction, i.e., an article transferring direction, by the urging of the frames 50 against the lower position of the base frame 30.

Figure 4:
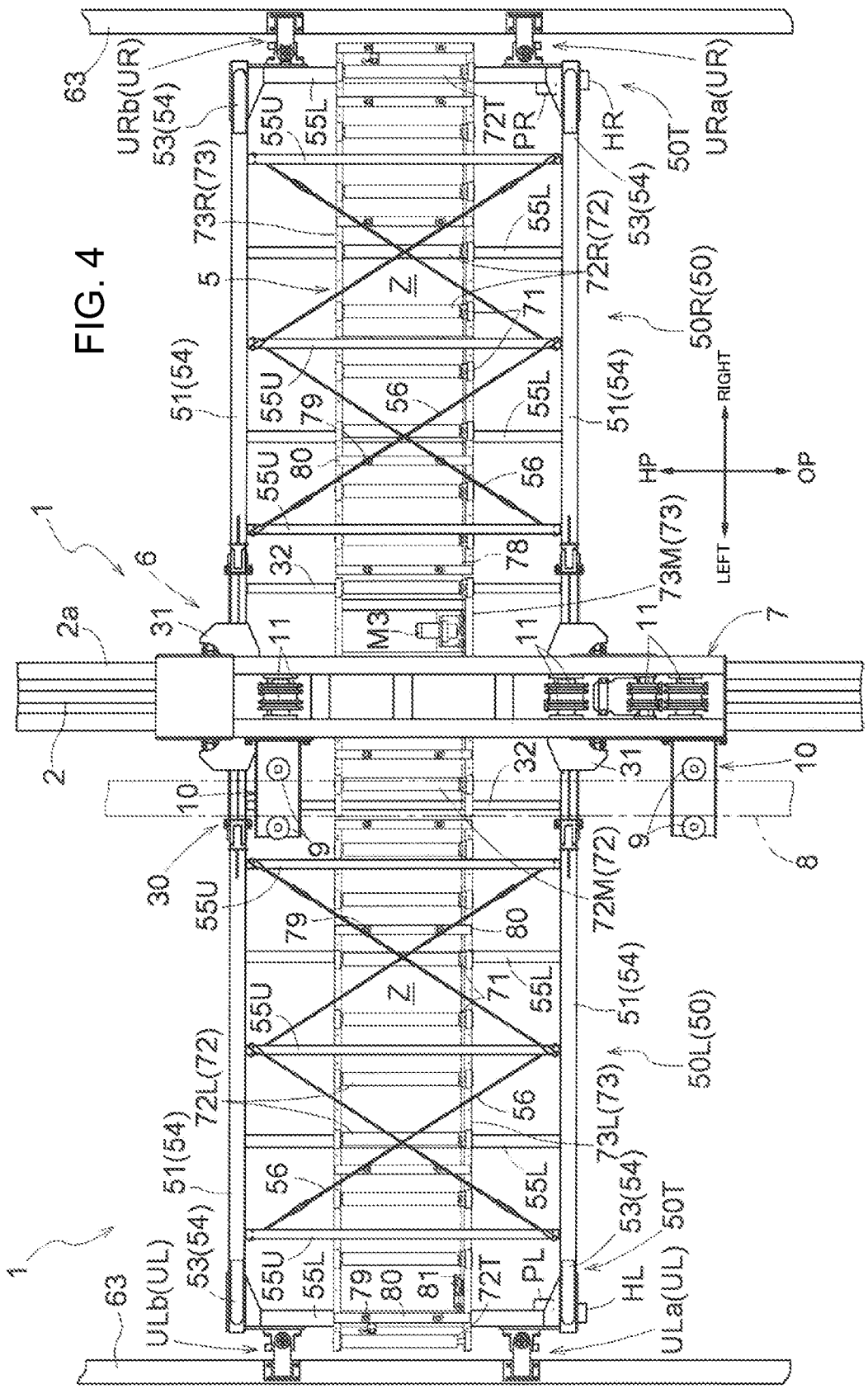
FIG. 4 is a fragmentary, plan and partially hidden view of the stacker crane of FIG. 1.

As shown in FIGS. 2, 4 and 5, in each of the end frames 50, a pair of truss frames 54 is provided spaced in the front and rear direction, which is a horizontal direction intersecting to the article transferring direction. The truss frame 54 is comprised of the upper frame 51 and the lower frame 52 spaced in an upper and lower direction and parallel to each other along the left and right direction (the article transferring direction), and a plurality of inclined members 53 disposed in a left and right direction along the vertical surface. The end frame 50 is constituted by a pair of such truss frames 54 and a plurality of horizontal members 55 arranged in a left and right direction to connect the truss frames 54 to one another at a plurality of positions. The truss frames 54 form an article containing space Z, in which articles W to be conveyed can be freely contained.

An upper horizontal member 55U for connecting the upper frames 51 and a lower horizontal member 55L for connecting the lower frames 52 are provided as the plurality of horizontal members 55 for connecting the pair of truss frame 54 in each end frame 50. The upper horizontal members 55U adjacent to each other are connected to each other by connecting their opposite ends in a front and rear direction with the aid of horizontal brace 56. By tightening a turn buckle 56a provided at each horizontal brace 56, the strength against a twist of the end frame 50 is improved.

As shown in FIGS. 5 and 6, to both end portions in the left and right direction of the upright portion 30 of the base frame 30, a base side connector 44 and a base side urging plate 46 are welded. At the end portions of the base frame 30 side of each end frame 50, i.e. the right side end portion of the left side end frame 50L and the left side end portion of the right side end frame 50R, an end side connector 45 and an end side urging plate 47 are welded. The base frame 30 and the end frame 50 are pivotally connected by a knuckle joint system at the pivot connecting axis 43 under a condition in which the protruded plate formed with the end side connector 45 is held between the pair of front and rear connecting plates formed with the base side connector 44.

In this manner, each of the pair of end frames 50 is pivotally connected to the base frame 30 in a fluctuatable manner about the center of the horizontal axis that intersects to the left and right direction, i.e., the article transferring direction. By urging the base side urging plate 46 and the end side urging plate 47, the fluctuation to the lower side of the left side frame 50L and the right side frame 50R is restricted to maintain their position to the base frame 30.

As stated below, when placing the platform 6 at the article storage 61 as the target location for the transfer of the origin and receiving the article W under a condition in which the end portions 50T in the left and right direction of the platform 6 is received and supported by the left and right article storages 61, even if the platform 6 is largely deformed by the fact that the base frame 30 is lifted down due to the extension of the lifting chain 12 by the weight of the article W, the damage of the platform 6 can be prevented because each of the pair of end frames 50 is fluctuated about the center of the horizontal axis with respect to the base frame 30.

Fluctuation detecting sensors SY are provided to detect the fluctuation of the pair of frames 50 with respect to the base frame 30 about the center of horizontal axis. The fluctuation detecting sensor SY is composed of a photo micro sensor having an optical axis along the front and left direction. As shown in FIG. 5, the fluctuation detecting sensors SY are supported by fluctuation sensor attaching brackets 48, respectively, which are attached to the left and right end portions of the pair of upright portions 31, respectively. At the base frame 30 side end portions of each end frame 50, i.e., the right end portion of the left end frame 50L and the left end portion of the right end frame 50R, a body 69 to be detected for fluctuation is provided, which is comprised of a folded plate member. A tip portion of the body 69 is detected by the corresponding fluctuation detecting sensors SY at two positions in the front and rear of the lower end portion. Then, when any one of the pair of end frames 50 is fluctuated about the pivotally connecting axis 43, the tip portion of the body 69 becomes out of the optical axis extended along the front and rear direction of the fluctuation detecting sensors SY so that the fluctuation detecting sensor SY in a detecting condition is switched to a non-detecting condition and, therefore, it is possible to detect the fluctuation of at least one of the pair of end frames 50 with respect to the base frame 30. In this manner, the stacker crane 1 comprises four fluctuation sensors SY as the fluctuation detecting means for detecting the fluctuation of at least one of the end frames 50 with respect to the base frame 30.

As shown in FIG. 1, the transfer device 5 is mounted and supported on the upper surface of the lower horizontal member 55L. As depicted in FIGS. 4 and 6, the transfer device 5 comprises a plurality of rotating rollers 72 having a sprocket 71 at one of the ends thereof in a condition in which the rotating center of axes are along the front and rear direction. At a plurality of left and right portions (article transfer directions) of the pair of front and rear conveyer frames 73, which are disposed on the upper surface of the lower portion 55L in a front and rear direction, conveyer roller bearings 74 are provided, on which both the ends of a plurality of rotating rollers 72 are rotatably supported.

As illustrated in FIGS. 4 to 6, the transferring device 5 is comprised of three parts, i.e., a first part disposed on the base frame 30, a second part on the right side frame 50R, and a third part on the left side frame 50L. To each part, a rotating roller 72 is provided. Among these rotating rollers 72, the base side roller 72M disposed on the base frame 30 is supported by a pair of front and rear frames 73M, which are provided across over the pair of left and right horizontal connecting members 32 of the base frame 30. The left end side roller 72L disposed on the left end frame 50L is supported by a pair of front and rear left side frames 73L that are disposed inside on the upper portion of the plurality of lower horizontal members 55L for connecting the pair of front and rear lower frames 52 of the left side frame 50L, in a front and rear direction. In the same manner, the right end side roller 72R disposed on the right end frame 50R is supported by a pair of front and rear right side frames 73R that are disposed inside on the upper portion of the plurality of lower horizontal members 55L for connecting the pair of front and rear lower frames 52 of the right side frame 50R.

As depicted in FIGS. 5 and 6, on the lower portion of the pair of front and rear center frames 73M, a transfer motor M3 is provided being supported by a transfer motor support frame 74. On the core of rotating axis of the transfer motor M3, a driving sprocket 76 is rotatably connected so as to be united thereto. At a height located at an intermediate position between the driving sprocket 76 and the sprocket 71 for the rotating roller 72 in a vertical direction and at a position slightly deviated from the driving sprocket 76 in the left and right direction, a pair of guide sprockets 77 are provided on the OP side frame out of the pair of front and rear center frames 73M in a freely idling manner.

Figure 8:
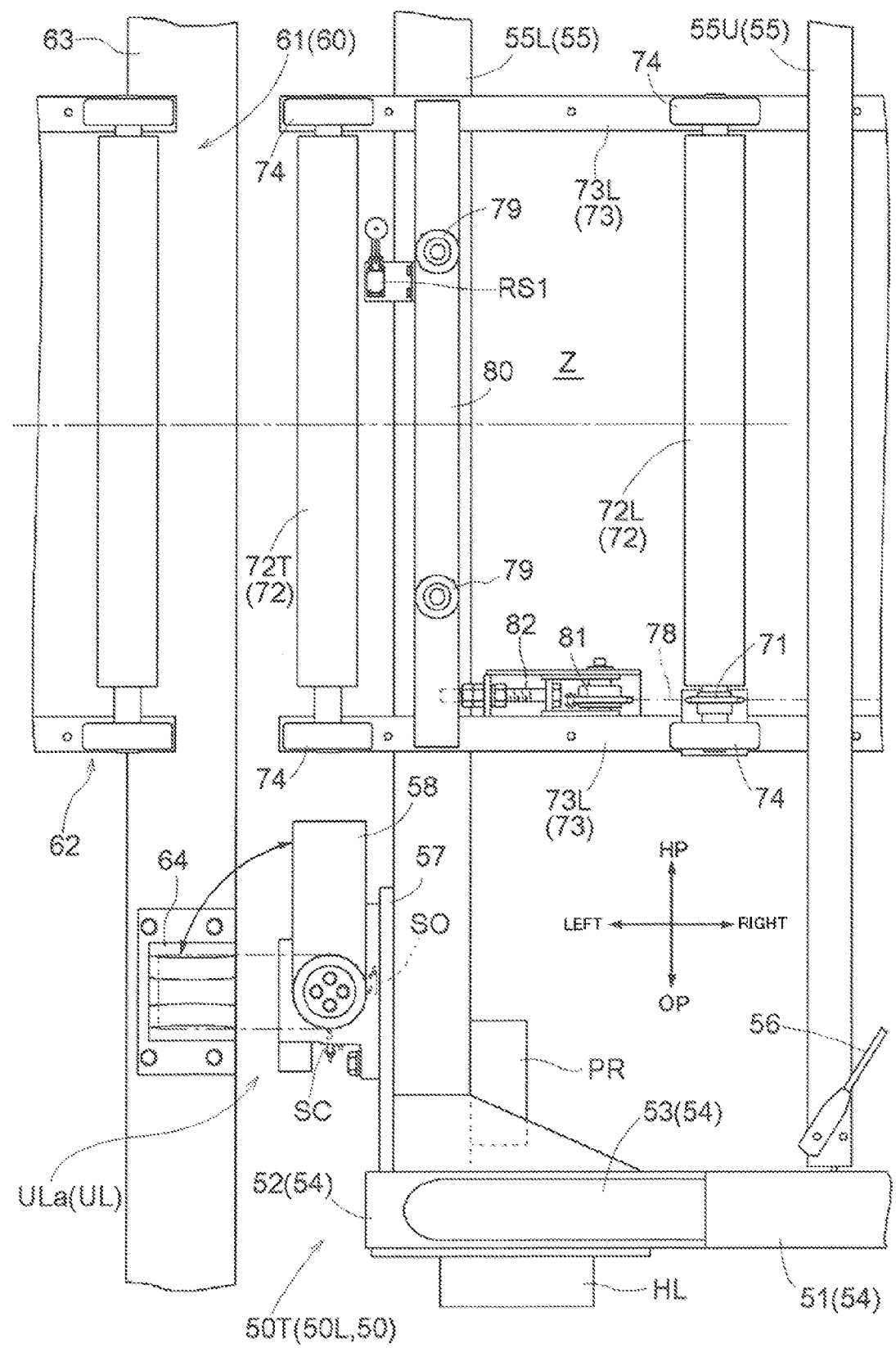
FIG. 8 is a fragmentary, plan and partially hidden view of a construction of a side portion of a left side edge of a platform and its peripheral portion of the stacker crane of FIG. 1.

As represented in FIG. 8, between the end roller 72T located at the end portion 50T of the left side frame 50L and the rotating roller 72L adjacent to the roller 72T, a tension sprocket 81 is provided via a bracket, such that the tension sprocket 81 is located at the left end portion of the OP side right frame 73L and the position of the sprocket 81 in the article transferring direction (left and right direction) is freely adjustable with the aid of adjuster bolt 82. Although not shown in the figures, between the end roller 72T located at the end portion 50T of the right side frame 50R and the rotating roller 72R adjacent to the roller 72T, a driven sprocket whose attachment portion is fixed is rotatably provided.

A ring-shaped driving chain 78 is wound over a plurality of sprockets including: the driving sprocket 76 disposed in the center of the transfer device 5 in the left and rear direction, a pair of guide sprockets 77, a tension sprocket 81 disposed on the left end of the transferring device in a left and right direction, and the driven sprocket disposed on the right end of the driving device in the left and right direction. The upper wound part of the ring-like driving chain 78 is engaged to the lower sides of the sprockets 71 of the base side roller 72M, the left end side roller 72L, and the right end side roller 72R, respectively; therefore, when the driving chain 78 is wound and driven by the transferring motor M3, the plurality of rotation rollers 72 are rotated and driven at the same time.

As representatively illustrated by the end portion 50T of the left side frame 50L in FIG. 8, the end rollers 72T disposed at the end portions 50T of the left side frame 50L and the right side frame 50R, out of the plurality of rotation rollers 72, are supported by the conveyer roller bearing 74 in a freely idling manner.

In this manner, in the present exemplary embodiment, the platform 6 is constituted as a truss frame, which comprises a pair of end frames 50 comprised of the left side frame 50L and right side frame 50R. In this embodiment, the transferring device 5 is constituted by a transferring conveyor mounted and supported on the plurality of lower horizontal members 55L as the plurality of horizontal members of the left end frame 50L as the truss frame and the right end frame 50R as the truss frame.

As shown in FIGS. 2, 4, and 6 to 8, the transferring device 5 comprises a pair of guide rollers 79 disposed in the width direction (front and rear direction) at a plurality of positions in the article transferring direction (left and right direction). Guide roller supporting plates 80 for supporting a pair of guide rollers 79 are connected to a plurality of positions of the pair of front and rear conveyor frames 73 in the article transfer direction, respectively. On the bottom surface of the article W, two concave grooves are formed in a width direction, which are extended over the longitudinal full length of the article, so that the plurality of pairs of the guide rollers 79 are engaged into the two concave grooves to guide the articles W to be conveyed by the transferring device 5 along the article transferring direction.

On the guide roller supporting plate 80 disposed on the end portion 50T of the left side frame SOL, a left end limit switch RS1 is provided, which acts on the bottom surface of the article W to detect the existence of the article at the left end. The switch RS1 can detect if the front end and the rear end of the article W being conveyed by the transferring device 5 in the article transferring direction has passed over the installed position of the switch. Although not shown in the figures, a right end limit switch RS2 is provided on the guide roller supporting plate 80, which is disposed on the end portion 50T of the right side frame 50R, in the same manner (see FIG. 10). Furthermore, at the center of the transferring device 5 in the article transferring direction, a central sensor group SG constituted of a plurality of transmission optical sensors is provided. This sensor group SG emits a light in a horizontal detection to a portion to be detected, which is for detecting a proper transferring position, provided on the center of the bottom surface of the article W in its longitudinal direction (see FIG. 10).

As shown in FIGS. 2 and 4, the stacker crane 1 is disposed so as to reciprocally move on the path between a pair of left and right article storage racks 60, which are disposed in the left and right direction. Each of the article storage racks 60 comprise article storages 61 lengthwise and breadthwise for freely storing lengthy articles W with a position that the longitudinal direction thereof is along the front and rear direction of the rack (a depth direction of the rack). In each article storage 61, a rack side conveyor 62 having its transferring direction in the rack front and rear direction is provided. A rack side conveyor controller (not shown) for controlling the actuation of the plurality of rack side conveyors 62 independently communicates with a ground side controller C, which commands the article conveying work to the stacker crane 1, so that the rack side conveyor 62 in the transfer target article storage 61 actuates to transfer the article in a direction for transferring the article when transferring the article W between the storage 61 and the stacker crane 1.

Figure 7:
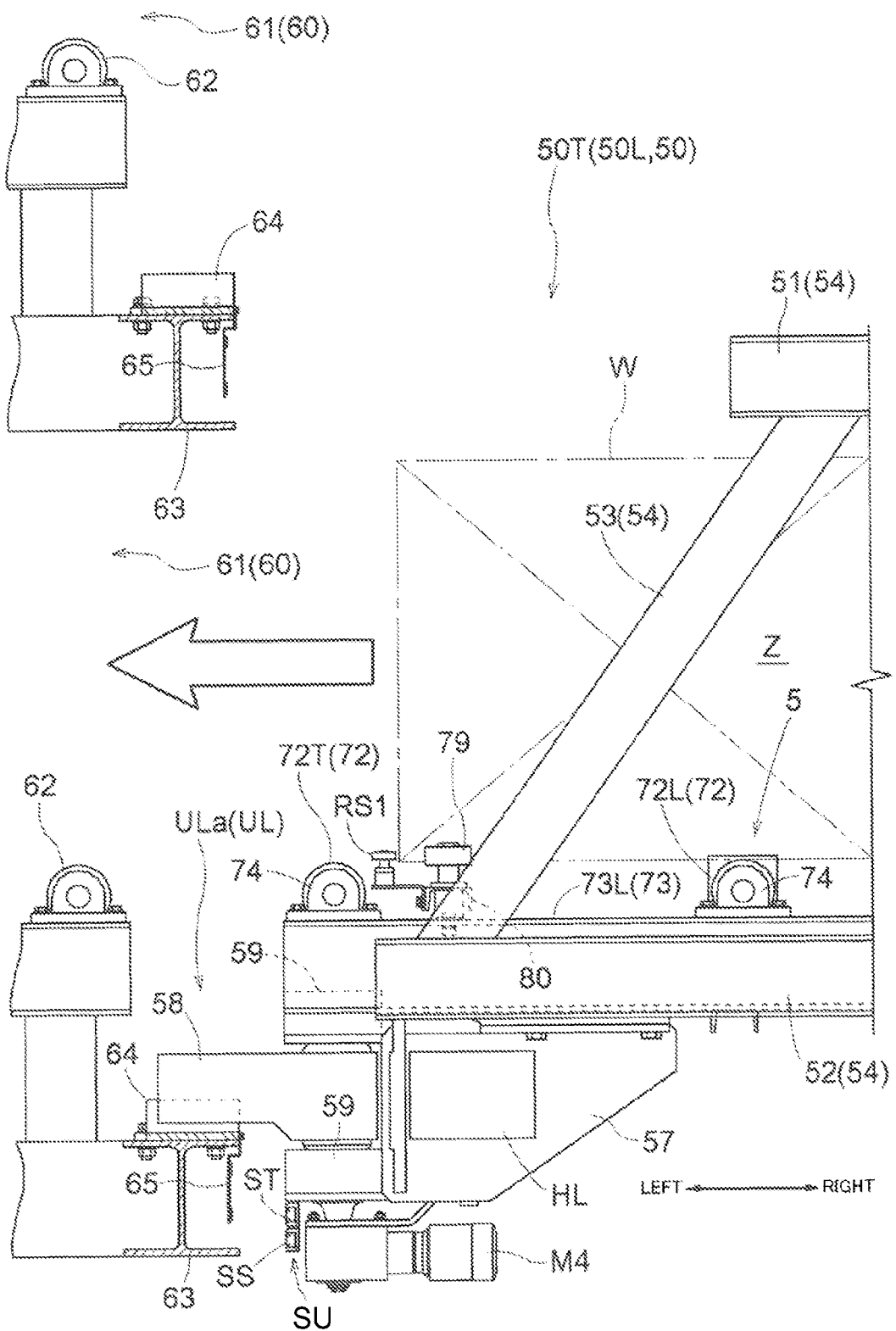
FIG. 7 is a fragmentary, front elevational view of a construction of a left side end portion of the platform, which is working to transfer an article, and its peripheral portion of the stacker crane of FIG. 1.

A horizontal connecting member 63 comprised of an H-shaped steel is provided at the front side of the article storage racks 60 for connecting the plurality of rods adjacent one another of the article storage racks 60 at the front side of the racks. On the horizontal connecting member 63, a pair of receivers 64, which are disposed as convex portions each having an opening upwardly, are separately provided in the rack width direction. The positions where the receivers are provided correspond to the article storages 61, respectively, in the rack width direction. As shown in FIGS. 7 and 8, the pair of receivers 64 are fixed to the upper surface of the horizontal connecting member 63 by bolts and protrude upwardly. The distance between the pair of receivers 64 is the same as that between the pair of front and rear rock arms 58 provided on the stacker crane 1 side. When the rock arms 58 are received and supported by the receivers 64, the mount and transfer surfaces of the rack side conveyors 62 of the article storages 61 and the transferring device 5 of the stacker crane 1 coincide with one another.

In the automated storage system according to the present invention, the stacker crane 1 performs the article transferring work for installing the article W using the loading plate (not shown) as the target location for the transfer of the origin and any one of the article storages 61 of the pair of article storage racks 60 as the target location for the transfer of the destination, and the article transferring work for uninstalling the article W using any one of the article storages 61 of the pair of article storage racks 60 as the target location for the transfer of the origin and using the loading plate as the target location for the transfer of the designation. That is to say, the transfer device 5 can freely transfer the article W to the target locations for the transfer located at both sides in the article transferring direction.

When the stacker crane 1 transfers the article W between the stacker crane and the article storage 61, the platform 6 is located at the lifting position for the transfer, where the pair of front and rear rock arms 58 provided at the outside end 50T of the platform 6 in the article transferring direction are received and supported by the pair of receivers 64 in the article storage 61, which is a target for the transfer; then the transferring device 5 actuates to transfer the article under a condition in which the pair of front and rear rock arms 58 on the outside end portion 50T of the platform 6 in the article transferring direction are received and supported by the receivers 64 of the article storages 61.

In this exemplary embodiment, as shown in FIGS. 2 and 4, the transferring device 5 is actuated to transfer the article, in a condition in which the pair of front and rear rock arms 58 provided on each of the left and right end portions 50T of the platform 6 are received and supported by the pair of receivers 64 provided each of the target article storage 61 and the article storage 61 corresponding thereto.

It should be noted that a pair of load plates (not shown) are provided both sides of the path of the stacker crane 1, and each of the pair of load plates comprises a loading plate transferring device comprised of a roller conveyor and a pair of receivers 64, in the same manner as the article storages 61. In the case that the stacker crane 1 transfers and receives the article W between the stacker crane and one of the loading plates, using the loading plate as the target location for the transfer, the transferring device 5 actuates to transfer the article W under the condition in which the pair of front and rear rock arms 58 of the left and right end portions 50T are respectively received and supported by the pair of receivers 64 of the pair of loading plates, respectively. In this manner, the stacker crane 1 has rock arms 58 as members to be received at the outside end portions 50T of each of the pair of end frames 50 in the article transferring direction, which are received and supported by the receivers 64 provided on the target location for the transfer.

The construction of a pair of front and rear rock arm units UL provided on the end portion 50T of the left frame SOL of the platform 6 and a pair of front and rear rock arm units UR provided on the end portion 50T of the right frame SOR of the platform 6 will be explained below. It should be noted that because the pair of front and rear rock arm units UL on the left side end portion 50T is constituted as the same as the pair of front and rear rock arm units UR on the right side end portion 50T, the pair of front and rear rock arm units UL on the left side end portion 50T will be explained as a representative.

As shown in FIGS. 1 and 4, an OP side rock arm unit ULa and HP side rock arm unit ULb are provided on the end portion 50T of the left frame 50L as a pair of front and rear rock arm units UL with the aid of a pair of front and rear rock arm attachment brackets 57, respectively. To the OP side rock arm attachment bracket 57, a left side relay HL (see FIG. 2) for controlling the switching operation of the rock arm 58 in the pair of front and rear rock arm units UL and a left side power supply relay PL (see FIG. 4) for supplying an electric power for actuating to the pair of front and rear rock arm units UL. It should be noted that the left side relay HL and the left side power supply relay PL are connected to a lift controller HV provided on the base frame 30, so that the lift controller HV (see FIGS. 5, 6, and 10) can send and receive control signals and can be supplied an electric power.

Because the OP side rock arm unit ULa and HP side rock arm unit ULb have the same construction, only the construction of the OP side rock arm unit ULa will be explained below. As illustrated in FIGS. 7 and 8, the OP side rock arm unit ULa comprises: a rock arm 58, which is rotatably supported about the center of longitudinal axis by a pair of upper and lower self-aligning bearings 59 fixed to the rock arm attachment bracket 57 by bolts; a rock arm motor M4, which is supported by bracket extended in the lower left outside direction from the rock arm attachment bracket 57, for rotatably driving the rock arm 58; and a closed position detecting sensor SC and an open position detecting sensor SO as a open and close position detecting means for detecting if the rock arm 58 is in a closed position or in an open position.

The closed position detecting sensor SC and the open position detecting sensor SO are attached to the rock arm attachment brackets 57 and are comprised of photomicro sensors, which function to detect the existence of a plate to be detected, which is formed on the rotation base of the rock arm 58 so as to be rotated in an integrated manner. The closed position detecting sensor SC detects the situation that the rock arm 58 is in a closed position (shown by solid line in FIG. 8) where the tip of the rock arm 58 is protruded to the inside (HP side in case of the OP side rock arm unit ULa) of the front and rear direction along which the longitudinal direction of the rock arm 58 extends. The open position detecting sensor SO detects the situation that the rock arm 58 is in the open position (shown by a dot-dashed line in FIG. 8) where the tip of the rock arm 58 is protruded to the article storage side (left side in case of the pair of front and rear rock arm units UL at the left side end portion 50T) of the longitudinal direction of the rock arm 58 along the left and right direction. In this manner, the rock arm 58 as a body to be received is rotatably provided about the center of the longitudinal axis at the end portion 50T of the target location for the transfer in the article transfer direction of the platform 6. It is constituted to freely shift a position between the protruded position, where the rock arm is protruded to the target location for the transfer in the article transferring direction and received and supported by the receiver 64 provided on the target location for the transfer, and the retrieved position, where the rock arm separated from the receiver 64 in the article transferring direction.

As illustrated in FIG. 7, the OP side rock arm unit ULa is comprised of a sensor unit SU which includes a rock arm switching height detecting sensor SS and a rock arm seating detecting sensor ST. Each sensor of the sensor unit SU will be explained, referring to FIG. 9.

The rock arm switching height detecting sensor SS is a reflection-type optical sensor, which is configured to detect a reflecting plate 66 for detecting a switching height of rock arm. The plate is provided to correspond to a rock arm switching height VS, which is at a position slightly higher than the height of the receiver 64 in the article storage 61 as a target location for the transfer. The reflecting plate 66 for detecting the switching height has a reflecting range extended over a set range in a vertical direction, which has some margin in the vertical direction for the rock arm switching height VS. When the rock arm switching height detecting sensor SS detects a light reflected from the switching height detecting plate 66, a detecting signal is output showing the fact that the rock arm 58 is positioned at the rock arm switching height VS.

The seating detecting sensor ST is also a reflection-type optical sensor, which is configured to detect a light reflected by a reflecting plate 67 for detecting a seating height of rock arm. The plate is provided to correspond to a receiving and supporting height of VT, which is set at the same height as the receiver 64 in the article storage 61 as a target location for the transfer. The reflecting plate 67 for detecting the seating height has a reflecting range extended over a set range in a vertical direction, which has some margin in the vertical direction for the receiving and supporting height VT. When the rock arm seating height detecting sensor ST detects a light reflected from the reflecting plate 67 for detecting the seating height of the rock arm, a detecting signal is output showing the fact that the rock arm 58 is positioned at the height corresponding to that of the receiving and supporting height VT. That is to say, the seating detecting sensor ST functions as a sensor that can freely detect the portion to be detected corresponding to the receiver 64.

The reflection plate 66 for detecting the switching height and the reflection plate 67 for detecting the seating height are provided on a reflecting plate attachment plate 65, which is attached to a horizontal connecting member 63 in the article storage rack 60 so that the height thereof can be adjusted. To the reflecting plate attachment plate 65, a pair of adjustor plates 68 is provided, covering the upper side and the lower side of the reflection plate 67 for detecting a seating height, respectively. Each adjustor plate 68 is attached to the reflecting plate attachment plate 65 so as to be adjustable in the vertical direction with the aid of a pair of front and rear long holes provided on the plate 65. The reflecting range of the reflecting plate 67 for detecting the seating height can be adjusted by changing the vertical position of the pair of upper and lower adjustment plates 68. In this manner, the reflecting plate 67 for detecting the seating height is configured such that, when the height of the rock arm 58 is in a condition in which the end portion 50T of the platform 6 is received by the receiver 64, the seating detecting sensor ST detects the light reflected from the reflecting plate 67 for detecting the seating height. The reflection range of the reflecting plate 67 for detecting the seating height is adjusted in a vertical direction, corresponding to the margin of the set range for the receiving and supporting height VT, at which the rock arm 58 is received and supported by the receiver 64 on the target location for the transfer.

The sensor unit SU is provided on the left side end portion of the end portion 50T of the left frame SOL, i.e., at the top portion of the left frame SOL, with the aid of a rock arm attachment bracket 57. By such a configuration that the sensor unit SU is provided to be closest to the target location in a left and right direction, even if the height of the end portion 50T is deviated from the lifted position of the base frame 30, which is detected by the lifting rotary encoder RE2 by the fact that the left frame SOL is deformed to be flexed to a lower direction by the weight of the left frame SOL itself and the weight of the article W, the relative position of the rock arm 58 provided on the end portion 50T and the receiver 64 provided on the target location for the transfer can be accurately determined in a vertical direction.

The construction of the OP side rock arm unit ULa has been explained above. It should be noted that the HP side rock arm unit ULb has the same construction except for the rotating direction of the rock arm 58. Also, the pair of front and left rock arm units UL on the end portion 50T of the left arm 50L of the platform 6 has been explained. It should be noted that the pair of front and rear rock arm unit UR on the end portion 50T of the left frame 50R of the platform 6 also has an OP side rock arm unit URa and an HP side rock arm unit URb, as illustrated in FIG. 4.

The stacker crane 1 comprises a running controller HH provided on the left side surface at the lower portion of the OP side mast (see FIGS. 1 and 10), a lifting controller HV provided on the OP side upright carriage 31 of the platform 6 (see FIGS. 5, 6 and 10), and a left end relay HL (see FIGS. 7, 8 and 10) and a right end relay HR (see FIG. 10) provided on the left and right end portions 50T of the platform 6, respectively. The running operation, the lifting operation and the article transferring operation, etc. of the stacker crane 1 are controlled by programs installed in these controllers. Concretely, the lifting controller HV controls the function of the lifting motor M2 and the article transferring device 5 and functions as a controlling means therefor.

Figure 11:
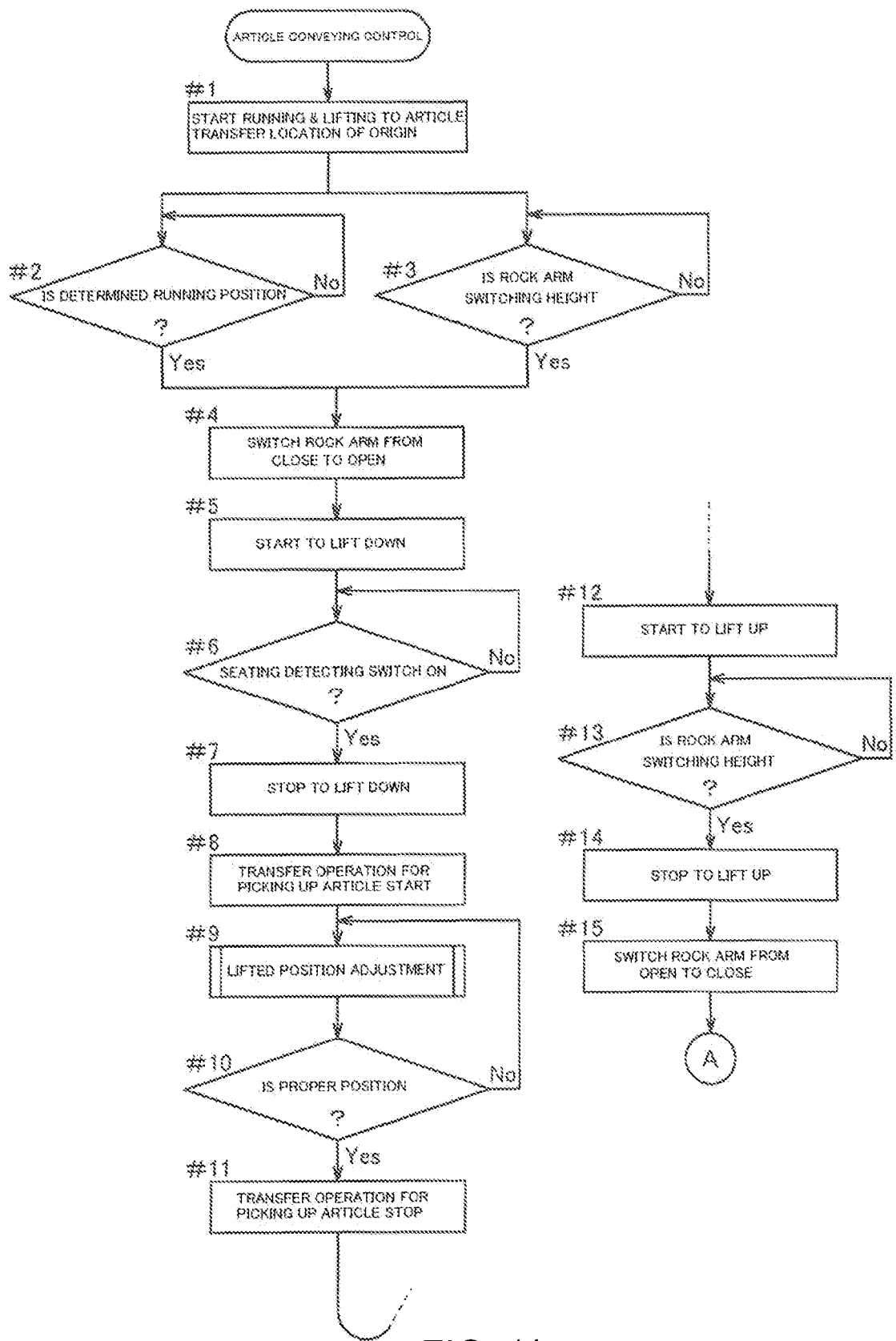
FIG. 11 is a portion of a flow chart for an exemplary embodiment for controlling an article transfer according to the invention.
Figure 12:
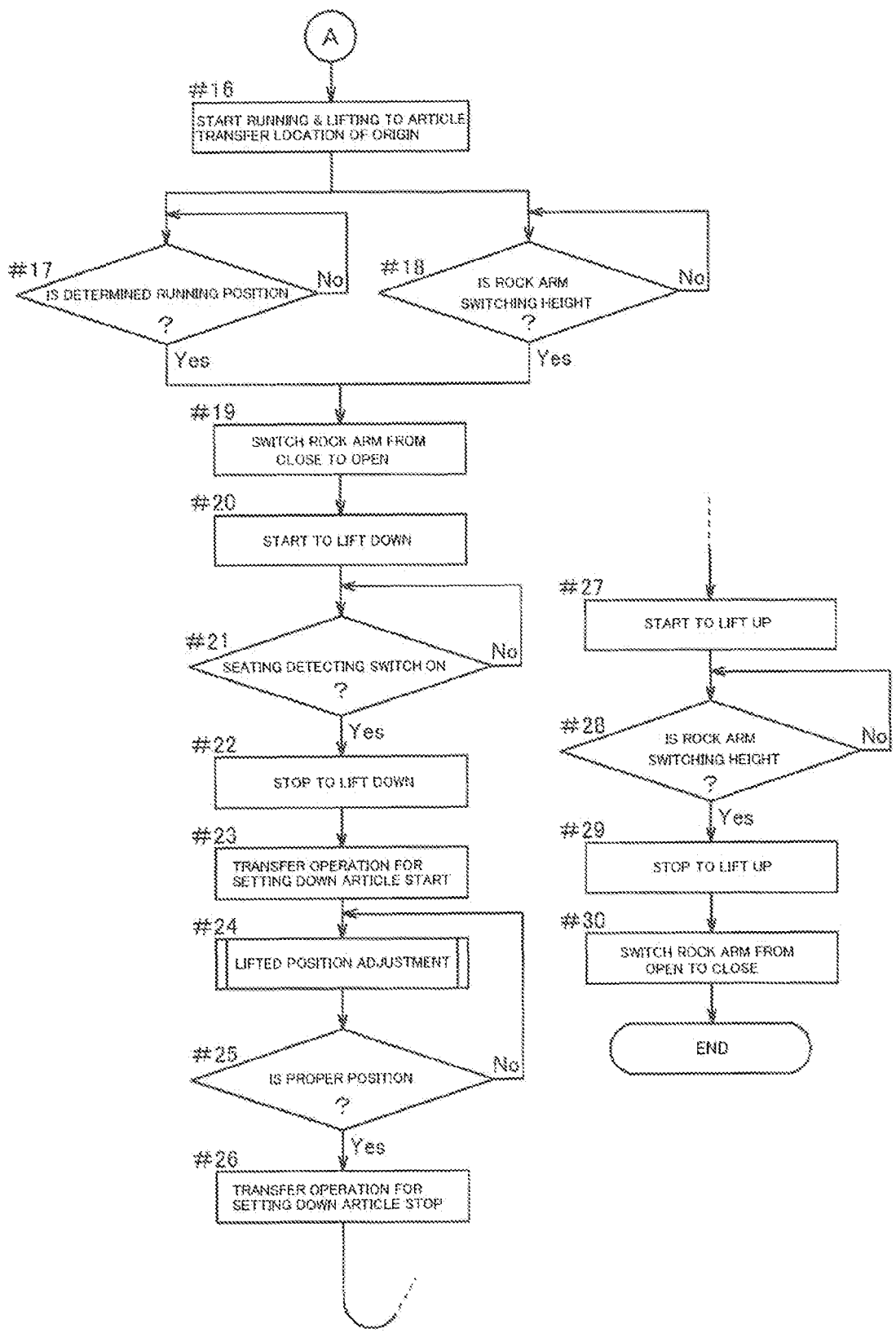
FIG. 12 is another portion of the flow chart of FIG. 11 for controlling the article transfer.

The control operations of the running controller HH, the lifting controller HV, and the left side relay HL and the right side relay HR when article transferring commands for loading or unloading articles are dispatched from the ground side controller C are explained with reference to the flow charts in FIGS. 11 and 12. FIGS. 11 and 12 show the control operation for transferring articles to the target location for the transfer of the origin and the control operation at the target location for the transfer of the origin (FIG. 11) and the control operation for transferring articles to the target location for the transfer of the destination and the control operation on the target location for the transfer on the destination (FIG. 12) in a separated manner. However, the movement of the article to the target location for the transfer is the same in each operation. Therefore, the common explanation for FIG. 12 is omitted here and the corresponding steps for FIG. 12 are mentioned along those for FIG. 11.

When the ground controller C dispatches a command for conveying an article, the running controller HH performs a running procedure by controlling the function of the running motor M1 so that the carriage 3 runs to a target position, which is a position for the article transfer preparation in a front and rear direction, in accordance with running position information detected from the running rotary encoder RE1; the lifting controller HV performs a lifting procedure by controlling the function of the lifting motor M2 so that the platform 6 is lifted to the target lifting position, which is a position for the article transfer preparation in a vertical direction, in accordance with information detected by the lifting rotary encoder RE2. The former procedure is for moving the platform 6 without an article mounted to the position of an article transfer preparation, which is set for the target location for the transfer of the origin, while the later procedure is for lifting a platform with an article moving to the position of an article transfer preparation, which is set for the target location for the transfer of the destination after the article transfer at the target location of the origin has been completed. For the article transfer to the target location for the transfer of the origin, reference is made to Steps #1 to #3 of FIG. 11, and for the article transfer to the target location for the transfer of the destination, reference is made to Steps. #16 to #18 of FIG. 12.

When the platform 6 is moved to the article transfer preparation position for the target location for the transfer by the running procedure and the lifting procedure, it should be confirmed that all (four) of the rock arm switching height detecting sensors SS are detecting the light from the reflection plates 66, which are provided for detecting the switching height by detecting signals output from the rock arm switching height detecting sensors SS; then the left end relay HL and the right end relay HR perform the rock arm switching procedures so that the rock arms 58 at the four positions are switched from a closed position to an open position (Steps #4 and #19 of FIGS. 11 and 12 respectively). That is to say, the article transfer preparation position in the vertical direction is set at the rock arm switching height VS. If the detecting signal from any of the rock arm switching height detecting sensors SS does not exist at the timing when the running procedure and the lifting procedure has been completed, in other words, if the fact is not confirmed that all (four) of the rock arm switching height detecting sensors SS are detecting the light reflected by the switching height detecting reflecting plates 66, the stacker crane 1 is emergency stopped as it is in disorder.

Then, the lifting controller HV controls the actuation of the lifting motor M2 to lift down the platform 6 with a preparation lifting speed, which is lower than the movement lifting speed for moving the platform 6, in accordance with information detected from the lifting rotary encoder RE2, so that the preparation lifting procedure for lifting the platform to the transferring position that is at the receiving and supporting height VT is performed by the rock arm 58 provided on the outside end portion 50T of the platform 6 in the article transferring direction (Steps #5 to #7 in FIG. 11, Steps #20 to #22 in FIG. 12). In this manner, by the movement lifting procedure and the preparation lifting procedure, the rock arm 58 is located at the receiving and supporting height VT and the platform 6 is located at the transferring lifting position, at which the outside end portion 50T of the platform 6 is received and supported by the receiver 64 in the target location for the transfer. Therefore, these lifting procedures are the present lifting procedures.

Figure 9:
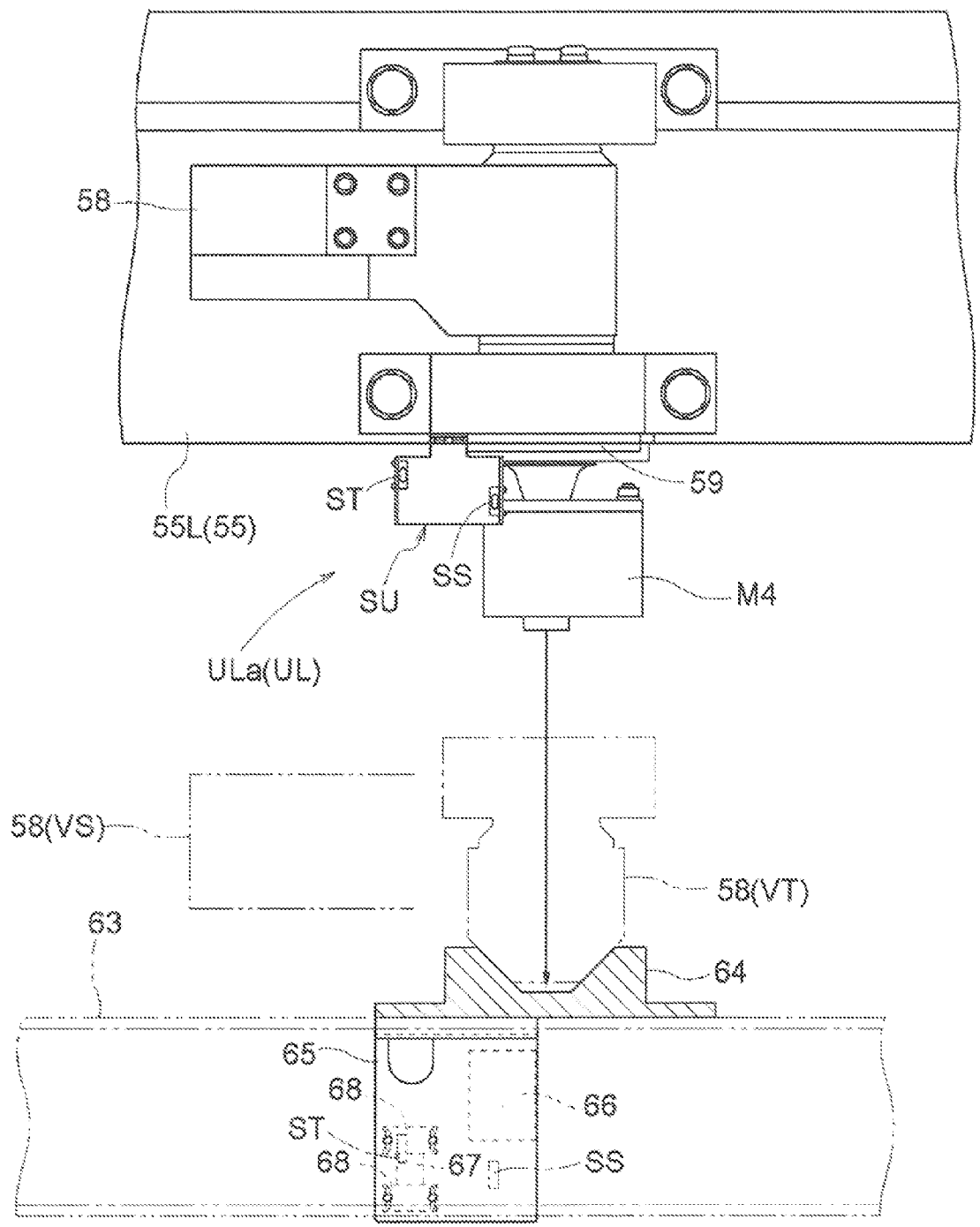
FIG. 9 is a fragmentary, enlarged partially cross-sectional view showing situations until a rock arm is received and supported by a receiver according to an exemplary embodiment of the invention.

During the preparation lifting procedure, while the rock arm 58, which has been switched to an open position at the transfer preparation position by the rock arm switching operation, is kept at the open position, the platform 6 is lifted down with the preparation lifting speed; at the time when the seat detecting sensor ST is switched ON, the lifting motor M2 stops the platform 6 since the fact is detected that the platform 6 is located at the movement lifting position (Step #6 of FIG. 11 and Step #21 of FIG. 12) In this manner, during the preparation lifting procedure, the platform 6 is lifted down with the preparation lifting speed in accordance with information detected from the lifting rotary encoder RE2, whilst the actuation of the lifting motor M2 is controlled to stop the platform 6 in accordance with information detected from the seating detecting sensor ST. Thereby, even if the height of the end portion 50T of the pair of end frames 50 with respect to the lifted position of the base frame 30 of the platform 6 cannot be determined due to the flexed deformation by the weight of the platform 6 which is caused by the platform itself and the weight of the article W, it is possible to position the platform 6 so as that the end portion 50T of the platform 6 is properly received at the receiver 64. It should be noted that such condition is shown in FIG. 9 with the aid of a double-dot-dashed line that the preparation lifting procedure is completed, the platform 6 is positioned at the transferring lifting position and at the receiving and supporting height VT at which the rock arm 58 is received and supported by the receiver 64. In a case where any seat detecting sensor ST does not become ON after a set time has passed from the time when the preparation lifting procedure was started, in other words, in case that the platform 6 was continuously lifted down for the set time period with the preparation lifting speed until all the seat sensors ST become ON, the stacker crane 1 is emergency stopped as it is in disorder.

The lifting controller HV performs the transferring procedure for the transfer device 5 to transfer the article W under the condition in which the end portion 50T is received and supported by the receiver 64 at the target location for the transfer, after the preparation lifting procedure has been properly completed (Steps #8 to #11 in FIG. 11, Steps #23 to #26 in FIG. 12).

During the transferring procedure, the transfer motor M3 is actuated in a rotating driving direction in accordance with the type of the transferring operations, which corresponds to the transferring actuation for receiving an article W from the target location for the transfer of the origin and to the transferring actuation for giving the article W to the target location for the transfer of the destination, to mount and transfer the article W by the transferring device 5. During the transferring procedure, the transferring device provided at the side of the target location for the transfer also operates in a direction corresponding to the type of the transferring operations.

To absorb a deviation of the lifted position of the platform 6, which is caused by the shift in the load acting on the platform 6 and varies as the article W is transferred in the article transferring direction, during the transferring procedures, the lifting controller HV performs the lifting position adjustment procedure for controlling the lifting motor M2 based upon information detected from the lifting rotary encoder RE2. The detail of the lifting position adjustment procedure is explained below.

During the transferring procedure for picking up an article W, the lifting controller HV determines if the article W is mounted and transferred to the proper transferring position, which is set as the position where the center of the transfer device 5 and the center of the article W in the article transferring direction are coincident to each other, based upon information detected from the left side limit switch RS1 and the right side limit switch RS2 provided in the transferring device 5 and the center sensors SG. When the article W has been mounted and transferred to the proper transferring position, the controller HV stops the actuation of the transferring motor M3, thereby completing the transferring of the article W (Step #10 of FIG. 11).

During the setting-down procedure for picking up an article W, when the fact that the rear end portion of the article W passes over the position of one of the limit switches RS1, RS2, which is provided at the front side in the article transferring direction and is detected by information for the left side limit switch RS1 and the right side limit switch RS2, the lifting controller HV considers that the article W has been mounted and transferred to the proper transferring position and then makes the actuation of the transferring motor M3 stop to complete the transfer of the article W (Step #25 of FIG. 12).

Once the transfer procedure for the article W has completed, a lifting procedure for controlling the operation of the lifting motor M2 just after the transfer procedure is performed by the lifting controller HV in accordance with information detected by the lifting rotary encoder RE2. This control is for positioning the platform 6 at the rock arm switching height VS in order to separate the outside end portion 50T of the platform 6 in the article transferring direction to an upper direction from the receiver 64 in the target location for the transfer. In the lifting procedure just after the transfer procedure, the controller HV controls the actuation of the lifting motor M2 in accordance with information detected by the lifting rotary encoder RE 2 so as to lift the platform 6 up with a lifting speed for just after transferring, which is set to be lower than the transferring lifting speed in the transferring lifting procedure, while keeping the rock arm 58 at an open position. Thereby, the platform 6 is lifted to the rock arm switching height VS with the lifting speed for just after transferring (Steps #12 to #14 of FIG. 11, Steps #27 to #29 of FIG. 12).

Once completing the lifting procedure just after the transferring, such a confirmation should be done that all (four) of the rock arm switching height detecting sensors SS are detecting the light reflected by the switching height detecting reflection plate 66 from an existence of a detecting signal from the rock arm switching height detecting sensors SS. Then, the left side relay HL and the right side relay HR perform the rock arm switching procedure, so that the rock arms 58 at the four points are switched from the open position to the closed position (Step #15 of FIG. 11, Step #30 of FIG. 12). In a case that the timing of completing the lifting procedure just after the transferring any signal from the rock arm switching height detecting sensors SS does not exist, that is to say, when the fact could not been confirmed that all (four) of the rock arm switching height detecting sensors SS were detecting the light from the switching height detecting reflecting plate 66, the stacker crane 1 is emergency stopped as it is in disorder.

Once properly completing the lifting procedure just after the transferring (Steps #12 to #14 of FIG. 11) after receiving the article W from the target location for the transfer of the origin and properly completing the rock arm switching procedure thereafter (Step #15 of FIG. 11), the process goes to Step #16 in FIG. 12, where the platform 6 moves to the transferring preparation position for the target location for the transfer of the destination. Further, once properly completing the lifting procedure just after the transferring (Steps #27 to #29 of FIG. 12) after the transferring operation for transferring the article W to the target location for the transfer of the destination, and then properly completing the rock arm switching operation thereafter (Step #30 of FIG. 12), the transferring operation of the article W from the origin to the destination on the basis of commands for transferring articles would be done to complete the article transferring control.

A lifting position adjusting procedure performed by the lifting controller HV will be explained with reference to the flow chart in FIG. 13. During the transferring procedures mentioned by Steps #8 to #11 in FIG. 11 and Steps #23 to #26 in FIG. 12, the lifting controller HV performs the lifting position adjusting procedures shown in the flow chart of FIG. 13 at every timing of control. That is to say, the lifting controller HV performs the procedures shown in the flow chart of FIG. 13 at the control timing for every control period (for instance, 10 milliseconds). In a case where the load acting on the platform 6 varies as the article W is transferred to the article transferring direction during the time of performing the transferring procedures and then the lifted position of the platform 6 varies from the standard lifted position to the limit position for lifting up or the limit position for lifting down, the controller HV controls the lifted actuation of the platform 6 in a direction opposite from the direction that the position of the platform 6 has been varied by a set amount in accordance with the type of the transferring operation. By this control, the variation of the lifted position of the platform 6, which is caused during the transferring procedures, can be absorbed.

For the lifted position adjustment procedures, the lifted position of the platform 6 at the time when the transferring procedures are started to be performed is set as an initial standard lifted position. And, if the lifted position of the platform 6 is varied from the standard lifted position, it is monitored at every time of the control based upon information detected from the lifting rotary encoder RE2 (Step #1 of FIG. 13).

Figure 14:
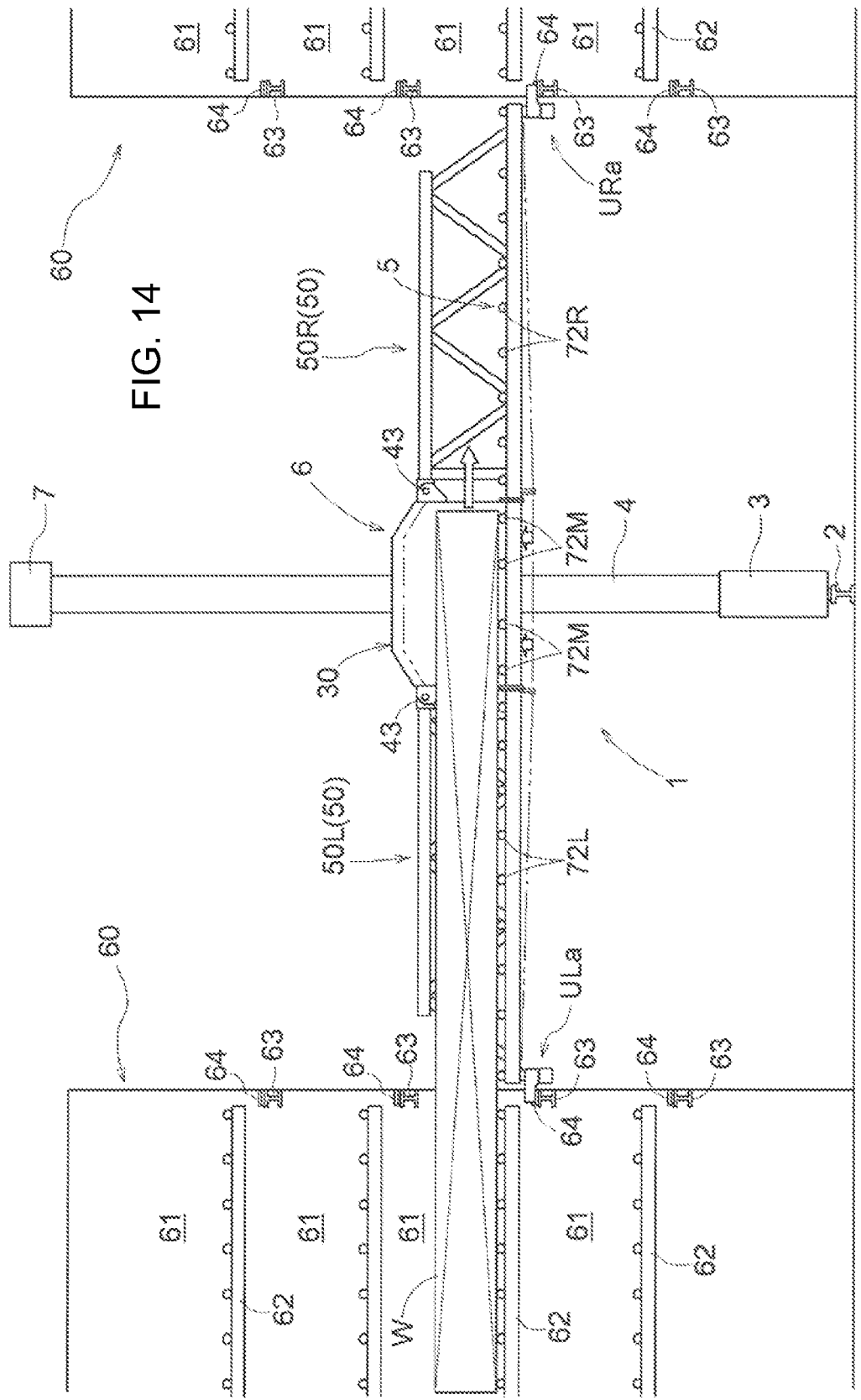
FIG. 14 is a fragmentary, front elevational view of an exemplary embodiment of a stacker crane according to the invention with a shift in the lifted position of a platform with an actuation of transferring.

In a case where the transferring device 5 performs the transferring operation for picking up the article, the load acting on the platform 6 increases as the article W is transferred from the target location for the transfer in the moving direct of the stacker crane 1, as shown in FIG. 14. As a result, the lifting chain 12 extends and the lifted position of the platform 6 is varied downwardly, as shown in FIG. 14 with a double-dot-dashed line.

In a case where the transferring device 5 performs the transferring operation for setting down the article, the load acting on the platform 6 decreases as the article W is transferred from the stacker crane 1 to the target location for the transfer, as shown in FIG. 15. As a result, the lifting chain 12, which has been extended by the load of the article W, is shortened; thereby the lifted position of the platform 6 is varied upwardly, as shown in FIG. 15 with a dot-dashed line. Therefore, during the transferring operation for picking up the article, a route from Step #1 to Step #2 of FIG. 13 is taken at every control timing, while, when the transferring operation for setting down the article, a route from Step #1 to Step #4 of FIG. 13 is taken at every control timing.

Figure 13:
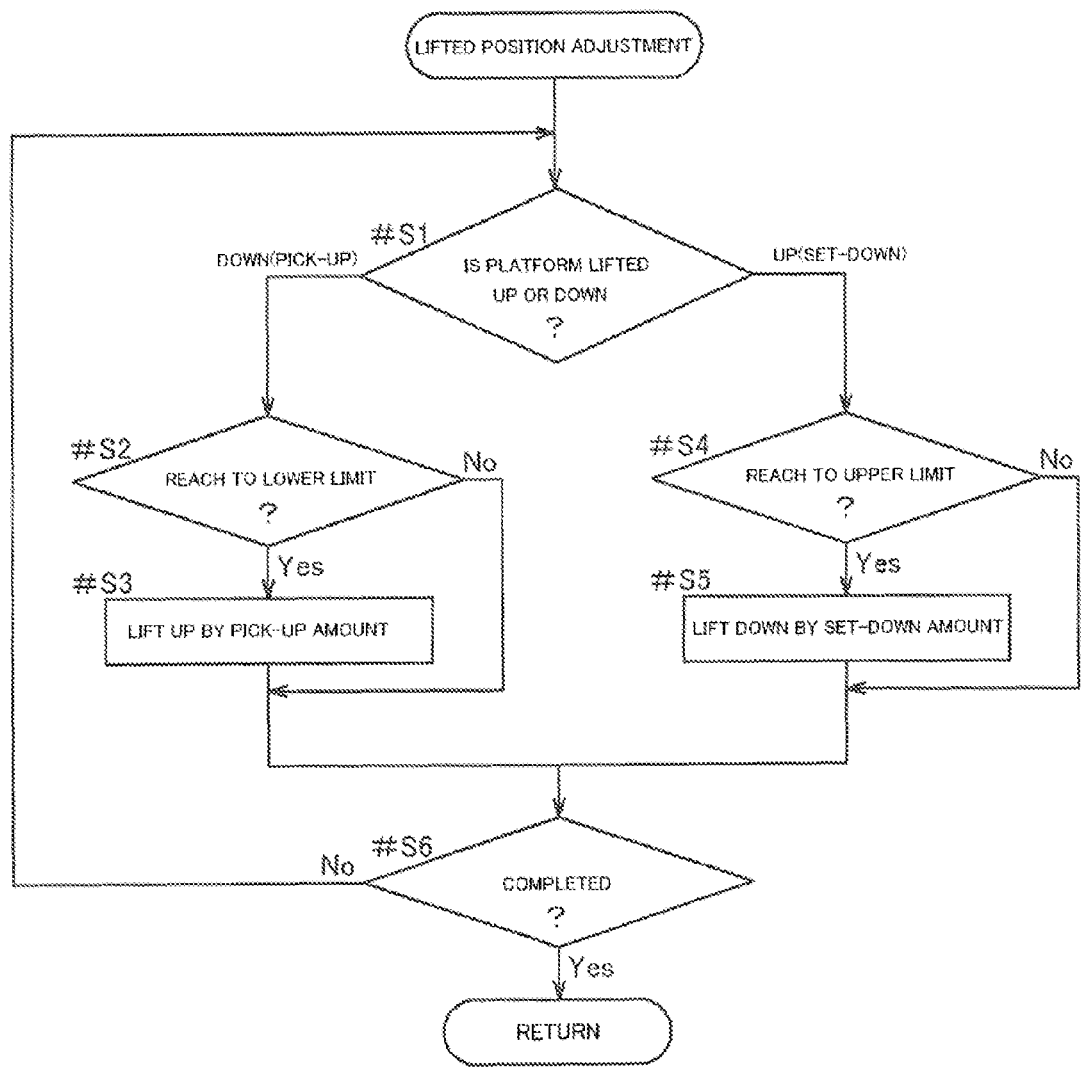
FIG. 13 is a flow chart of an exemplary embodiment of a lifted position adjusting procedure according to the invention.

If the lifted position of the platform 6 comes down to the lowest limit position, which is lower than the standard lifted position by a set distance, a route from Step #2 to Step #3 of FIG. 13 is taken at the controlling timing; the position that is higher than the lifted position at the controlling timing by a set distance for the pick-up of the article is updated as a new standard lifted position; the lifting motor M2 is rotated in accordance with information detected from the lifting rotary encoder RE2 to place the platform 6 to the newly set standard lifted position, as shown by upward arrows in FIG. 14. It should be noted that the lifted position adjustment procedure should not be performed until the platform 6 is lifted up by the set distance for picking up the article in order to prevent a situation where the lift up of the platform 6 by the lifted position adjustment procedure is also absorbed during the lifted position adjustment procedures. After recommencement of the lifted position adjustment procedure, it would be monitored if the platform comes down by a set distance from the updated new standard lifted position.

During the transferring operation for picking up an article, until the platform 6 comes to a position, which is lower than the standard lifted position by a set distance, even if the lifted position of the platform 6 comes down, the route from Step #2 to Step #6 of FIG. 13 is taken at every control timing, so that the platform 6 is not lifted up.

If the lifted position of the platform 6 comes up to the upper limit position which is higher than the standard lifted position by a set distance, the route from Step #4 to Step #5 of FIG. 13 is taken at the controlling timing; the position, which is lower than the lifted position at the controlling timing by a set distance for setting down the article, is updated as a new standard lifted position; the lifting motor M2 is rotated in accordance with information detected from the lifting rotary encoder RE2 in order to place the platform 6 to the newly set standard lifted position, and then the platform 6 is lifted down by the set distance for picking up the article, as shown by downward arrows in FIG. 15. It should be noted that the lifted position adjustment procedure should not be performed until the platform 6 is lifted down by the set distance for setting down the article in order to prevent a situation where the lift down of the platform 6 by the lifted position adjustment procedure is also absorbed during the lifted position adjustment procedures. After the recommencement of the lifted position adjustment procedure, it would be monitored if the platform comes up by a set distance from the updated new standard lifted position.

During the transferring operation for picking up an article, until the lifted position of the platform 6 comes to a position higher than the standard lifted position by a set distance, even if the lifted position of the platform 6 comes up, the route from Step #4 to Step #6 of FIG. 13 is taken at every control timing, so that the platform 6 is not lifted down. In this manner, in a case where the transfer for picking up the article W is from the target location for the transfer to the transferring device 5, when the platform 6 is lifted down to the lowest limit position that is lower than the transferring lifting position during the transferring procedures by a set height, the lifting controller HV controls the actuation of the lifting motor M2 so that the platform 6 is lifted up by the set distance for picking up the article during the lifted position adjustment procedure. Further, in a case where the transfer for setting down the article W for transferring the article from the transferring device 5 is to the target location for the transfer, when the platform 6 is lifted up to the highest limit position that is higher than the transferring lifting position by a set height during the transferring procedures, the lifting controller HV controls the actuation of the lifting motor M2 so that the platform 6 is lifted down by the set distance for setting down the article during the lifted position adjustment procedure.

At the commencement of the transferring actuation for picking up an article, no article is held by the platform, while at the commencement of the transferring for setting down the article, an article is held by the platform. Therefore, the load of the platform will be varied due to the existence of the article W. This is the reason why the transferring lifting position for picking up the article, which is the lifted position of the platform at the timing of commencement of the transferring actuation for the article W in the transferring operation for picking up is different from the transferring lifting position for setting down the article, which is the lifted position of the platform 6 at the timing of commencement of the transferring actuation for the article W in the transferring operation for setting down. That is to say, the transferring lifting position for picking up an article is at a position higher than the transferring lifting position for setting down an article by a difference due to the existence of the load of the article W.

The preferred lifted position for the platform 6 when the transferring operation of the article W is completed in the transferring operation for picking up is the transferring lifting position for setting down the article, which is the lifted position where the end portion 50T of the platform 6 is properly received and supported by the receiver 64 at the target location for the transfer under the condition of holding the same article. Contrary thereto, the preferred lifted position for the platform 6 when the transferring operation of the article W is completed in the transferring operation for setting down is the transferring lifting position for picking up the article, which is the lifted position where the end portion 50T of the platform 6 is properly received and supported by the receiver 64 at the target location for the transfer under the condition of holding the same article.

Therefore, the set distance for picking up the article in the lifted position adjustment procedure, which is performed during the transferring operation for picking up an article, is set to be larger than the difference between the standard lifted position and the lowest limit position, so that the lifted position of the platform 6 when the transferring operation for picking up the article is completed becomes coincident to the transferring lifting position for setting down the article. Thereby, when the platform 6 is lifted up by the set distance for picking up an article during the lifted position adjustment procedure, the platform 6 comes to a position higher than the standard lifted position before the update, so that, when the transferring procedure is completed, the lifted position of the platform 6 is as close to the transferring lifting position for setting down the article as possible.

Contrary thereto, the set distance for setting down the article in the lifted position adjustment procedure, which is performed during the transferring operation for setting down an article, is set to be larger than the difference between the standard lifted position and the highest limit position, so that the lifted position of the platform 6 when the transferring operation for setting down the article is completed becomes coincident to the transferring lifting position for picking up the article. Thereby, when the platform 6 is lifted down by the set distance for setting down an article during the lifted position adjustment procedure, the platform 6 comes to a position lower than the standard lifted position before the update, so that when the transferring procedure is completed, the lifted position of the platform 6 is as close to the transferring lifting position for picking up the article as possible.

The lifting controller HV monitors the detection of the fluctuation sensors SY during the time when the transferring procedures are performed, i.e., the time period for Steps #8 to #11 in FIG. 11 or the time period for Steps #23 to #26 in FIG. 12. In accordance with information detected from the fluctuation sensors SY, when at least one of the pair of end frames 50 fluctuate with respect to the base frame 30, the controller HV determines that the lifted position of the platform is not proper. That is to say, four fluctuation sensors SY work in the manner that all of the sensors SY become ON unless the end frame 50 of the platform 6 fluctuates with respect to the base frame 30; but if the end frame 50 fluctuates with respect to the base frame 30, even if only slightly due to troubles such as an incorrect function of the lifted position adjustment procedure in case of the transferring for picking up an article or an incorrect function of cutting off the lifting chain 12 during the transferring operation of the article, any of the fluctuation sensors SY would be OFF. Thus, if any one of the fluctuation sensors SY is switched to OFF, the lifting controller HV emergency stops the actuation of the stacker crane 1, assuming that such an emergency occurs where the end frame 50 of the platform 6 actuates with respect to the base frame 30.

The present invention has been explained above based upon the exemplary embodiments; however, it is not limited to these embodiments but is able to be varied or altered within the scope of the invention. Other exemplary embodiments are explained below:

(1) In the above-mentioned exemplary embodiments, an incremental type rotary encoder is used as the lifted position detecting means. However, an absolute-type rotary encoder can be used therefor or the lifted position detecting means can be constituted by a laser range finder.

(2) In the above-mentioned exemplary embodiments, a chain is used as the cord-like member; however, a wire can also be used therefor.

(3) In the above-mentioned exemplary embodiments, the outside end portion of the platform in the article transferring direction is received and supported by two receivers provided at the target location for the transfer; however, it is possible to configure this such that the outside end portion of the platform is received and supported by one or three or more receivers at the target location for the transfer.

(4) In the above-mentioned exemplary embodiments, the rock arm as a body to be held is rotatable about the center of the longitudinal axis; however, it is possible to have the rock arm be rotatable about the center of the vertical axis between the closed position at which the top end portion of the rock arm faces downwardly to a dropped position and the open position at which the top end portion faces the article container side to take a horizontal position, or it is also possible to have the rock arm not be rotated about an axis but to be retrievable in the article transferring direction.

(5) In the above-mentioned exemplary embodiments, four fluctuation sensors SY are disposed as a fluctuation detecting means; however only one sensor can be used for detecting a fluctuation in the front and rear direction. Further, these fluctuation sensors SY are comprised of photo-micro switches, however, limit switches or proximity switches can be used therefor.

(6) The controlling system shown in the exemplary embodiments is merely an example for the concrete constitution of the controlling measures of the invention. For instance, the controlling system could be realized by a controller and a program executed by the controller.

(7) In the exemplary embodiments mentioned above, the upper limit position is set at a position that is higher than the standard lifting position by a set distance and the lower limit position is at a position that is lower than the standard lifting position by the same distance. However, the set distances for the upper limit position and the lower limit position could be different from each other.

(8) In the exemplary embodiments mentioned above, the platform 6 is guided and supported by a lifting mast at the center of the article transferring direction; however, the positional relation between the platform 6 and the lifting mast could be shifted appropriately.

(9) In the exemplary embodiments mentioned above, the control means are configured to detect the actual range of the lifted position of the platform whilst executing the transferring procedures in accordance with information detected by the lifted position detecting means, and it controls the actuation of the lifting driving means in accordance with information detected by the lifted position detecting means so as to absorb the variation; however, alternatively or in addition to this, a transferred position detecting means for detecting a position of an article to be transferred in an article transferring direction in the transferring apparatus can be provided, so that the controlling means controls the actuation of the lifting driving means to adjust the lifted position of the platform in accordance with the position of the article in the article transferring direction in the transferring apparatus, which can be obtained by information from the transferred position detecting means and the lifted position detecting means.

LIST OF NUMERICAL REFERENCES

W Article
HV Control means
M2 Lifting driving means
RE2 Lifted position detecting means
ST Detecting Sensors
SY Fluctuation detecting means
Z Space for containing articles
4 Lifting mast
5 Transferring device (Transferring conveyor)
6 Platform
12 Cord-like member
30 Base frame
50L, 50R Base frame (truss frame)
50T End portion
51 Upper frame
52 Lower frame
53 Inclined members
54 Truss frame
55 A plurality of horizontal members
58 Body to be held
61 Target location for the transfer
64 Receiver
67 Body to be detected The foregoing description and accompanying drawings illustrate the principles, exemplary embodiments, and modes of operation of the invention. However, the invention should not be construed as being limited to the particular embodiments discussed above. Additional variations of the embodiments discussed above will be appreciated by those skilled in the art and the above-described embodiments should be regarded as illustrative rather than restrictive. Accordingly, it should be appreciated that variations to those embodiments can be made by those skilled in the art without departing from the scope of the invention as defined by the following claims.

What is claimed is:

1. A lengthy article transferring apparatus, comprising:
   a lifting mast;
   a cord-like member;
   a platform:
      being suspended and supported by the cord-like member;
      being operable to be freely lifted along the lifting mast and guided and supported by the lifting mast;
      having an outside end portion;
      having a transferring device operable to be freely lifted along with the platform in a united manner, the transferring device being operable:
         to mount and transport a lengthy article in a manner in which a longitudinal extent of the lengthy article is extended horizontally; and
         to freely transfer the lengthy article between the platform and a target location for the transfer in an article transferring direction;
      having a base frame to which the cord-like member is connected, the base frame having sides; and
      having a pair of end frames extended in the article transferring direction from both sides of the base frame, each of the pair of end frames having outer end portions and being pivotally connected to the base frame to be freely fluctuated about a center of a horizontal axis intersecting the article transferring direction;
   a lifting driving means for lifting and driving the platform and the transferring device by winding the cord-like member;
   a lifted position detecting means for detecting a lifted position of the platform; and
   a controlling means for controlling actuation of the lifting driving means and the transferring device, the controlling means being operable:
      to perform a lifting operation for positioning the platform at a lifted position for transfer, at which the outside end portion of the platform is received and supported by a receiver provided at the target location for the transfer in the article transferring direction based upon information detected by the lifted position detecting means;
      after the lifting operation has been completed, to perform a transferring operation that actuates the transferring device when in a condition in which the outside end portion is received and supported by the receiver at the target location for the transfer; and
      to perform a lifted position adjustment procedure that controls actuation of the lifting driving means based upon information detected by the lifted position detecting means during performance of the transferring operation to absorb a shift in the lifted position of the platform due to a variation in load acting on the platform, which load varies as the lengthy article is transported in the article transferring direction.

2. The lengthy article transferring apparatus according to claim 1, wherein the controlling means is operable to:
   determine if the platform has lifted down to a lower limit position, when the transferring operation for picking up the lengthy article to transfer the lengthy article from the target location to the transferring device is performed by the transferring operation as the lifted position adjustment procedure, the lower limit position being only lower than the lifted position for transferring by a set height based on information detected from the lifted position detecting means; and
   control actuation of the lifting driving means to lift up the platform by a set amount appropriate for picking up the lengthy article when the platform arrives at the lower limit position during the time when the transferring operation is performed.

3. The lengthy article transferring apparatus according to claim 1, wherein:
the transferring device is operable to freely transfer the lengthy article to each of various target locations for the transfer, the target locations being positioned at both sides of the platform in the article transferring direction; and
bodies to be held are provided at each of the outer end portions of each of the pair of end frames in the article transferring direction, the bodies being received and supported by receivers provided at the target locations for the transfer.

4. The lengthy article transferring apparatus according to claim 3, further comprising a fluctuation detecting means for detecting if at least one of the pair of end frames has fluctuated about the center of the horizontal axis intersecting the article transferring direction with respect to the base frame, the controlling means being operable to determine if the lifted position of the platform is not correct based upon information detected by the fluctuation detecting means in cases in which at least one of the pair of end frames has fluctuated with respect to the base frame.

5. The lengthy article transferring apparatus according to claim 1, wherein, when transferring the lengthy article from the transferring device to the target location for the transfer is performed by the transferring operation, the controlling means is operable to:
determine if the platform has been lifted up to an upper limit position, which is only higher than the lifted position for transferring by a set height based upon information detected by the lifted position detecting means; and
control actuation of the lifting driving means to move down the platform by a set amount appropriate for setting down the lengthy article when the platform arrives at the upper limit position.

6. The lengthy article transferring apparatus according to claim 1, wherein:
the platform comprises detecting sensors for freely detecting the portions to be detected at the target location for the transfer corresponding to receivers, the portions to be detected being disposed to be detected by the detecting sensors in a condition in which the outside end portions of the platform have been received by the receivers; and
the controlling means is operable to stop an actuation of the lifting driving means when the detecting sensors detect the portions to be detected and the platform is positioned at the lifted position for transferring.

7. The lengthy article transferring apparatus according to claim 1, wherein:
the platform comprises:
upper and lower frames in parallel and spaced apart from each other in a vertical direction along the article transferring direction;
horizontal members; and
a plurality of inclined members disposed in the article transferring direction along a perpendicular plane to connect the upper and lower frames to each other and form a pair of truss frame portions, the truss frame portions being disposed horizontally perpendicular to the article transferring direction with a space therebetween, the pair of truss frame portions being connected to each other with the horizontal members disposed in the article transferring direction to form a truss frame in which is defined an article containment space for freely containing the lengthy articles to be conveyed; and
the transferring device comprises a transferring conveyor mounted and supported by the horizontal members of the truss frame.

8. A lengthy article transferring apparatus, comprising:
a lifting mast;
a cord-like member;
a platform:
being suspended and supported by the cord-like member;
being operable to be freely lifted along the lifting mast and guided and supported by the lifting mast;
having an outside end portion;
having a transferring device operable to be freely lifted along with the platform in a united manner, the transferring device being operable:
to mount and transport a lengthy article in a manner in which a longitudinal extent of the lengthy article is extended horizontally; and
to freely transfer the lengthy article between the platform and a target location for the transfer in an article transferring direction;
having a base frame to which the cord-like member is connected, the base frame having sides; and
having a pair of end frames extended in the article transferring direction from both sides of the base frame, each of the pair of end frames having outer end portions and being pivotally connected to the base frame to swing freely about a center of a horizontal axis intersecting the article transferring direction;
a lifting driver operable to lift and drive the platform and the transferring device by moving the cord-like member;
a lifted position detector operable to detect a lifted position of the platform; and
a controller programmed to control actuation of the lifting driver and the transferring device, the controller being operable:
to perform a lifting operation for positioning the platform at a lifted position for transfer, at which the outside end portion of the platform is received and supported by a receiver provided at the target location for the transfer in the article transferring direction based upon information detected by the lifted position detector;
after the lifting operation has been completed, to perform a transferring operation that actuates the transferring device when in a condition in which the outside end portion is received and supported by the receiver at the target location for the transfer; and
to perform a lifted position adjustment procedure that controls actuation of the lifting driver based upon information detected by the lifted position detector during performance of the transferring operation to absorb a shift in the lifted position of the platform due to a variation in load acting on the platform, which load varies as the lengthy article is transported in the article transferring direction.

9. The lengthy article transferring apparatus according to claim 8, wherein the controller is operable to:
determine if the platform has moved down to a lower limit position, when the transferring operation for picking up the lengthy article to transfer the lengthy article from the target location to the transferring device is performed by the transferring operation as the lifted position adjustment procedure, the lower limit position being lower than the lifted position for transferring by a set height based on information detected from the lifted position detector; and control actuation of the lifting driver to lift up the platform by a set amount sufficient to pick up the lengthy article when the platform arrives at the lower limit position during the time when the transferring operation is performed.

10. The lengthy article transferring apparatus according to claim 8, wherein:

the transferring device is operable to freely transfer the lengthy article to each of various target locations for the transfer, the target locations being positioned at both sides of the platform in the article transferring direction; and bodies to be held are provided at each of the outer end portions of each of the pair of end frames in the article transferring direction, the bodies being received and supported by receivers provided at the target locations for the transfer.

11. The lengthy article transferring apparatus according to claim 10, further comprising a fluctuation detector operable to detect if at least one of the pair of end frames has fluctuated about the center of the horizontal axis intersecting the article transferring direction with respect to the base frame, the controller being operable to determine if the lifted position of the platform is incorrect based upon information detected by the fluctuation detector when at least one of the pair of end frames has fluctuated with respect to the base frame.

12. The lengthy article transferring apparatus according to claim 8, wherein, when the transferring operation is performed to transfer the lengthy article from the transferring device to the target location, the controller is operable to:

determine if the platform has been lifted up to an upper limit position higher than the lifted position for transferring by a set height based upon information detected by the lifted position detector; and control actuation of the lifting driver to move down the platform by a set amount appropriate for setting down the lengthy article when the platform arrives at the upper limit position.

13. The lengthy article transferring apparatus according to claim 8, wherein:

the platform comprises detecting sensors operable to detect portions of receivers at the target location for the transfer, the portions to be detected being detectable by the detecting sensors when the outside end portions of the platform have been received by the receivers; and the controller is operable to stop an actuation of the lifting driver when the detecting sensors detect the portions and the platform is positioned at the lifted position for transferring.

14. The lengthy article transferring apparatus according to claim 8, wherein:

the platform comprises:

parallel upper and lower frames spaced apart from each other in a vertical direction along the article transferring direction;

horizontal members; and a plurality of inclined members disposed in the article transferring direction along a perpendicular plane and connecting the upper and lower frames to each other to form a pair of truss frame portions, the pair of truss frame portions being disposed horizontally perpendicular to the article transferring direction with a space therebetween, the pair of truss frame portions being connected to each other with the horizontal members disposed in the article transferring direction to form a truss frame in which is defined an article containment space for freely containing the lengthy articles to be conveyed; and the transferring device comprises a transferring conveyor mounted and supported by the horizontal members of the truss frame.

* * * * *